United States Patent
Sugimoto et al.

(10) Patent No.: US 12,217,026 B2
(45) Date of Patent: Feb. 4, 2025

(54) SYSTEM AND METHOD FOR DEVICE PROFILE CREATION IN AN INTEGRATED DEVELOPMENT ENVIRONMENT

(71) Applicant: Rockwell Automation Technologies, Inc., Mayfield Heights, OH (US)

(72) Inventors: Thomas Kazushige Sugimoto, Solon, OH (US); Qin Cheng Jin, Liaoning (CN); Wang Zhen, Liaoning (CN)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 85 days.

(21) Appl. No.: 17/846,314

(22) Filed: Jun. 22, 2022

(65) Prior Publication Data

US 2023/0418568 A1 Dec. 28, 2023

(51) Int. Cl.
*G06F 8/34* (2018.01)
*G06F 9/451* (2018.01)

(52) U.S. Cl.
CPC ............. *G06F 8/34* (2013.01); *G06F 9/451* (2018.02)

(58) Field of Classification Search
CPC ....... G06F 8/34; G06F 9/451; G05B 19/0426; H04L 41/08; H04L 41/22
See application file for complete search history.

(56) References Cited

U.S. PATENT DOCUMENTS

| | | | | |
|---|---|---|---|---|
| 8,750,606 | B2 * | 6/2014 | Sugita | H04N 1/603 358/1.9 |
| 9,195,477 | B1 * | 11/2015 | Spencer | H04L 67/34 |
| 9,389,845 | B2 * | 7/2016 | Gupta | G06F 8/61 |
| 9,983,775 | B2 * | 5/2018 | Jain | G06F 9/451 |

(Continued)

FOREIGN PATENT DOCUMENTS

| | | | |
|---|---|---|---|
| EP | 2787685 A1 | 10/2014 | |
| EP | 3009900 B1 | 1/2020 | |
| WO | WO-2013012726 A2 * | 1/2013 | G06F 8/71 |

OTHER PUBLICATIONS

Extended European Search Report received for EP Patent Application Serial No. 23175064.7 dated Oct. 27, 2023, 8 pages.

(Continued)

*Primary Examiner* — Daxin Wu
(74) *Attorney, Agent, or Firm* — Amin, Turocy & Watson, LLP

(57) ABSTRACT

An industrial integrated development environment (IDE) is extended to support creation of device profiles using an intuitive graphical development environment. The environment comprises a device profile development interface that allows a user to select device profile views to be included in a device profile for an industrial device, and to submit edits to the underlying code for the selected device profile views. The system can then generate a new device profile from the modified device profile code. The device profile can be registered with the industrial IDE and used to view and edit device parameters of a corresponding industrial device. The (Continued)

device profile development environment also supports dynamic validation of profile view edits, rendering of graphical previews of the modified device profile view, and submission of both code-based and graphical profile view edits.

20 Claims, 33 Drawing Sheets

(56) References Cited

U.S. PATENT DOCUMENTS

| | | | | |
|---|---|---|---|---|
| 2009/0019313 | A1* | 1/2009 | Pokala | G06F 9/451 |
| | | | | 714/37 |
| 2010/0070909 | A1* | 3/2010 | Biltz | G06F 30/367 |
| | | | | 715/764 |
| 2012/0124504 | A1* | 5/2012 | Maybee | G06F 11/3636 |
| | | | | 715/772 |
| 2013/0211546 | A1* | 8/2013 | Lawson | H04L 67/02 |
| | | | | 700/9 |
| 2014/0337429 | A1* | 11/2014 | Asenjo | H04L 67/10 |
| | | | | 709/204 |
| 2016/0327925 | A1* | 11/2016 | Leonelli | G05B 19/0426 |
| 2017/0084273 | A1 | 3/2017 | Zohar et al. | |
| 2017/0212657 | A1* | 7/2017 | Burciu | G06F 9/451 |
| 2018/0088564 | A1 | 3/2018 | Billi-Duran et al. | |
| 2019/0215343 | A1* | 7/2019 | Rykowski | H04L 63/205 |
| 2020/0206920 | A1 | 7/2020 | Ma et al. | |
| 2021/0003996 | A1* | 1/2021 | Nagabhairava | G05B 19/4183 |
| 2021/0089278 | A1 | 3/2021 | Dunn et al. | |
| 2022/0066415 | A1* | 3/2022 | Miller | G06Q 10/087 |
| 2022/0398355 | A1* | 12/2022 | Idota | G06F 30/17 |

OTHER PUBLICATIONS

Extended European Search Report received for EP Patent Application Serial No. 23175343.5 dated Nov. 17, 2023, 9 pages.

Communication Pursuant to Rule 69 EPC received for European Patent Application Serial No. 23175343.5 dated Jan. 5, 2024, 2 pages.

Communication Pursuant to Rule 69 EPC received for European Patent Application Serial No. 23175064.7 dated Jan. 5, 2024, 2 pages.

Non-Final Office Action received for U.S. Appl. No. 14/675,129 dated May 4, 2017, 58 pages.

Non-Final Office Action received for U.S. Appl. No. 17/846,165 dated Oct. 1, 2024, 50 pages.

* cited by examiner

SYSTEM AND METHOD FOR DEVICE PROFILE CREATION IN AN INTEGRATED DEVELOPMENT ENVIRONMENT

BACKGROUND

The subject matter disclosed herein relates generally to industrial automation systems, and, for example, to industrial programming development platforms.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for developing device profiles is provided, comprising a user interface component configured to render a device profile development interface comprising an explorer window and a configuration area, and in response to receiving selection of a device profile view from a list of device profile views rendered in the explorer window, display, in the configuration area, code that defines the device profile view, wherein the device profile views represent respective graphical interfaces of a device profile; and a device profile generation component configured to modify the code for the device profile view in accordance with editing input received via interaction with the configuration area to yield modified code, and to generate the device profile based on the modified code.

Also, one or more embodiments provide a method, comprising rendering, by a system comprising a processor, a device profile development interface comprising an explorer window and a configuration area; in response to receiving selection of a device profile view from a list of device profile views rendered in the explorer window, displaying, by the system in the configuration area, code that defines the device profile view, wherein the device profile views represent respective graphical interfaces of a device profile; in response to receiving, via interaction with the configuration area, editing input directed to an element of the code, modifying, by the system, the code in accordance with the editing input to yield modified code; and generating, by the system, the device profile based on the modified code.

Also, according to one or more embodiments, a non-transitory computer-readable medium is provided having stored thereon instructions that, in response to execution, cause a system to perform operations, the operations comprising rendering, on a client device, a device profile development interface comprising an explorer window and a configuration area; in response to receiving selection of a device profile view from a list of device profile views rendered in the explorer window, displaying, in the configuration area, code that defines the device profile view, wherein the device profile views represent respective graphical interfaces of a device profile; in response to receiving, via interaction with the configuration area, editing input directed to an element of the code, modifying the code in accordance with the editing input to yield modified code; and generating the device profile based on the modified code.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
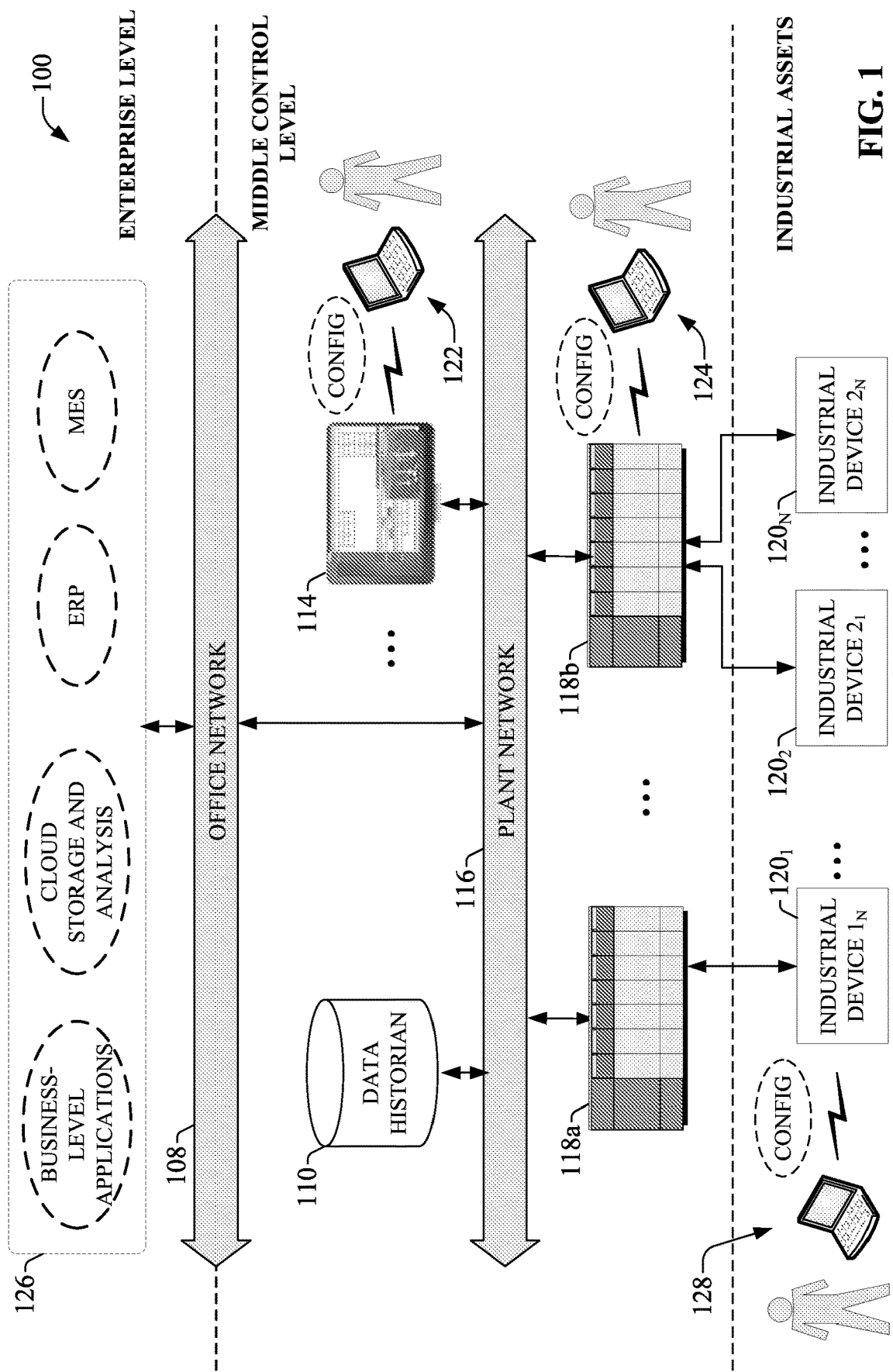
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMIs 114 using an HMI development platform (e.g., executing on client device 122) and download the resulting visualization files to the HMI 114. Some industrial devices 120—such as motor drives, telemetry devices, safety input devices, etc.—may also require configuration using separate device configuration tools (e.g., executing on client device 128) that are specific to the device being configured. Such device configuration tools may be used to set device parameters or operating modes (e.g., high/low limits, output signal formats, scale factors, energy consumption modes, etc.).

The necessity of using separate configuration tools to program and configure disparate aspects of an industrial automation system results in a piecemeal design approach whereby different but related or overlapping aspects of an automation system are designed, configured, and programmed separately on different development environments. For example, a motion control system may require an industrial controller to be programmed and a control loop to be tuned using a control logic programming platform, a motor drive to be configured using another configuration platform, and an associated HMI to be programmed using a visualization development platform. Related peripheral systems—such as vision systems, safety systems, etc.—may also require configuration using separate programming or development applications.

This segregated development approach can also necessitate considerable testing and debugging efforts to ensure proper integration of the separately configured system aspects. In this regard, intended data interfacing or coordinated actions between the different system aspects may require significant debugging due to a failure to properly coordinate disparate programming efforts.

To address at least some of these or other issues, one or more embodiments described herein provide an integrated development environment (IDE) for designing, programming, and configuring multiple aspects of an industrial automation system using a common design environment and data model. Embodiments of the industrial IDE can be used to configure and manage automation system devices in a common way, facilitating integrated, multi-discipline programming of control, visualization, and other aspects of the control system.

In general, the industrial IDE supports features that span the full automation lifecycle, including design (e.g., device selection and sizing, controller programming, visualization development, device configuration, testing, etc.); installation, configuration and commissioning; operation, improvement, and administration; and troubleshooting, expanding, and upgrading.

Embodiments of the industrial IDE can include a library of modular code and visualizations that are specific to industry verticals and common industrial applications within those verticals. These code and visualization modules can simplify development and shorten the development cycle, while also supporting consistency and reuse across an industrial enterprise.

To support enhance development capabilities, projects creating using embodiments of the IDE system can be built on an object-based model rather than, or in addition to, a tag-based architecture. To this end, the IDE system can support the use of automation objects that serve as building blocks for this object-based development structure. To ensure consistency within and between projects, as well as to ensure that a given industrial project is dynamically updated to reflect changes to an industrial asset's attributes (e.g., control code, visualization definitions, testing scripts, analytic code, etc.), embodiments of the IDE system can use automation object inheritance features to propagate changes made to an automation object definition to all instances of the automation object used throughout a control project.

Additionally, some embodiments of the industrial IDE system can include device profile creation tools that extend the IDE system's capabilities by allowing users to create device profiles using an IDE-type development interface. These tools allow device vendors or end users to easily create device profiles that can be stored in a device profile library and added to automation projects as needed. Device profiles created in this manner can be used to set device configurations or parameter values for corresponding devices—e.g., controller modules, motor drives, smart devices, etc.—within the system project.

Figure 2:
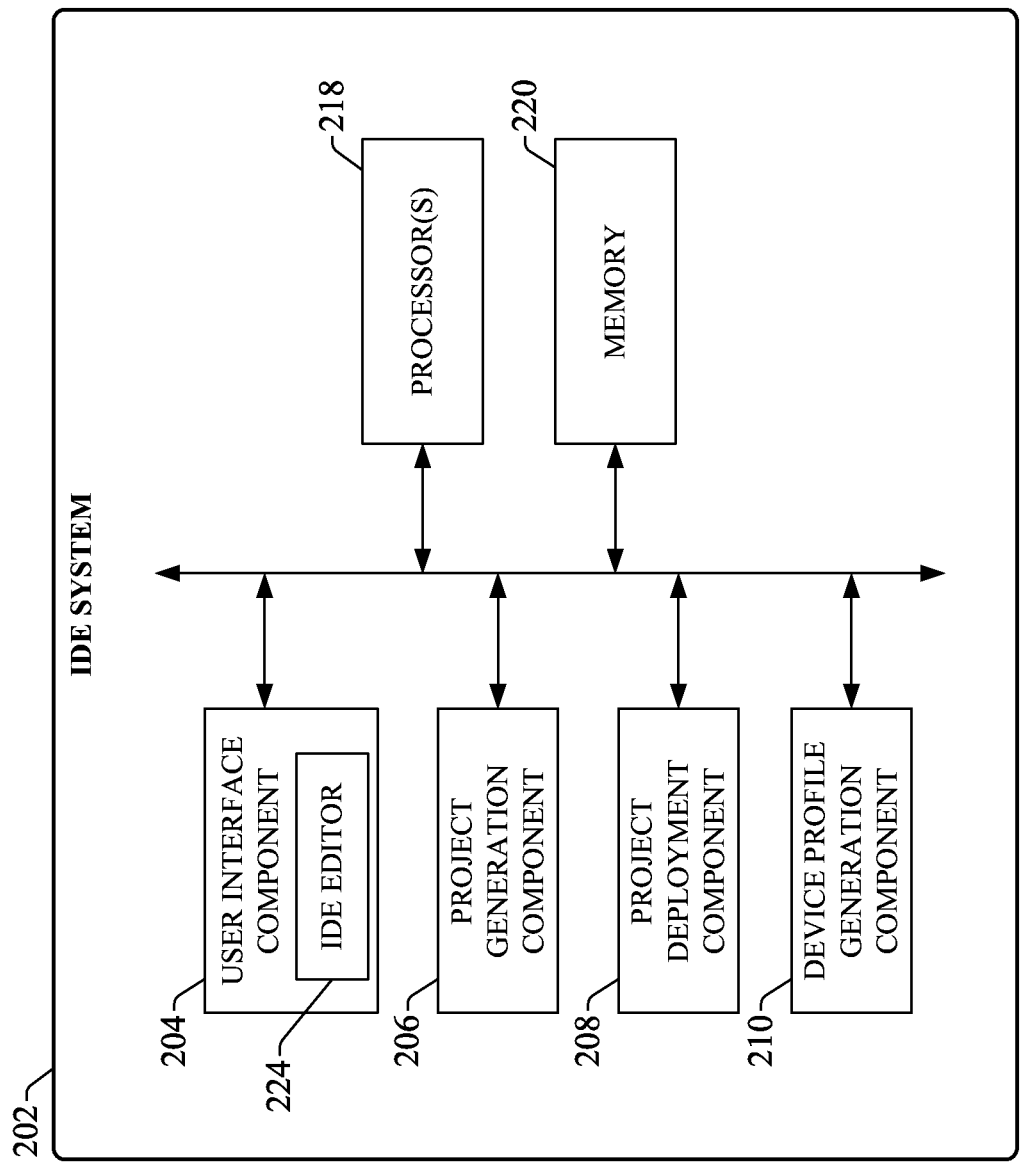
FIG. 2 is a block diagram of an example integrated development environment (IDE) system.

FIG. 2 is a block diagram of an example integrated development environment (IDE) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 202 can include a user interface component 204 including an IDE editor 224, a project generation component 206, a project deployment component 208, a device profile generation component 210, one or more processors 218, and memory 220. In various embodiments, one or more of the user interface component 204, project generation component 206, project deployment component 208, device profile generation component 210, the one or more processors 218, and memory 220 can be electrically and/or communicatively coupled to one another to perform one or more of the functions of the IDE system 202. In some embodiments, components 204, 206, 208, and 210, can comprise software instructions stored on memory 220 and executed by processor(s) 218. IDE system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with an IDE client that executes on a client device (e.g., a laptop computer, tablet computer, smart phone, etc.) that is communicatively connected to the IDE system 202 (e.g., via a hardwired or wireless connection). The user interface component 204 can then receive user input data and render output data via the IDE client. In other embodiments, user interface component 314 can be configured to generate and serve suitable interface screens to a client device (e.g., program development screens), and exchange data via these interface screens. Input data that can be received via various embodiments of user interface component 204 can include, but is not limited to, programming code, industrial design specifications or goals, engineering drawings, AR/VR input, DSL definitions, video or image data, device configuration data, device profile definition data, or other such input. Output data rendered by various embodiments of user interface component 204 can include program code, programming feedback (e.g., error and highlighting, coding suggestions, etc.), programming and visualization development screens, project testing results, etc.

Project generation component 206 can be configured to create a system project comprising one or more project files based on design input received via the user interface component 204, as well as industrial knowledge, predefined code modules and visualizations, and automation objects 222 maintained by the IDE system 202. Project deployment component 208 can be configured to commission the system project created by the project generation component 206 to appropriate industrial devices (e.g., controllers, HMI terminals, motor drives, AR/VR systems, etc.) for execution. To this end, project deployment component 208 can identify the appropriate target devices to which respective portions of the system project should be sent for execution, translate these respective portions to formats understandable by the target devices, and deploy the translated project components to their corresponding devices.

Device profile generation component 210 can be configured to generate a reusable device profile corresponding to a type of industrial device, asset, or system. The device profile can define configuration parameters for the corresponding industrial device, as defined by an authorized user of the IDE system 202. The device profile generation component 210 can generate the device profile based on profile definition data submitted by the user via a graphical profile definition interface rendered by the user interface component 204.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
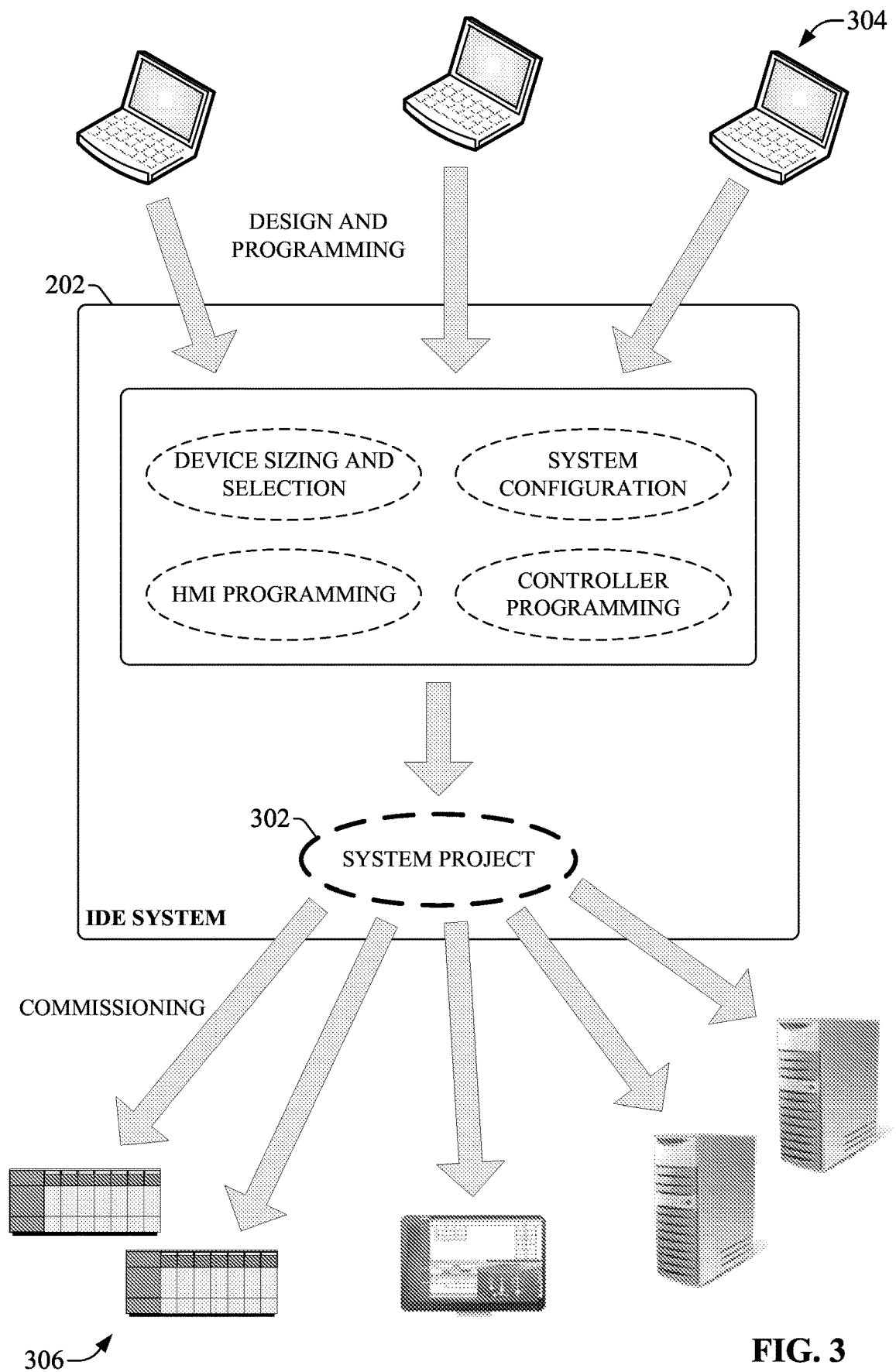
FIG. 3 is a diagram illustrating a generalized architecture of an industrial IDE system.

FIG. 3 is a diagram illustrating a generalized architecture of the industrial IDE system 202 according to one or more embodiments. Industrial IDE system 202 can implement a common set of services and workflows spanning not only design, but also commissioning, operation, and maintenance. In terms of design, the IDE system 202 can support not only industrial controller programming and HMI development, but also sizing and selection of system components, device/system configuration, AR/VR visualizations, and other features. The IDE system 202 can also include tools that simplify and automate commissioning of the resulting project and assist with subsequent administration of the deployed system during runtime.

Embodiments of the IDE system 202 that are implemented on a cloud platform also facilitate collaborative project development whereby multiple developers 304 contribute design and programming input to a common automation system project 302. Collaborative tools supported by the IDE system can manage design contributions from the multiple contributors and perform version control of the aggregate system project 302 to ensure project consistency.

Based on design and programming input from one or more developers 304, IDE system 202 generates a system project 302 comprising one or more project files. The system project 302 encodes one or more of control programming; HMI, AR, and/or VR visualizations; device or sub-system configuration data (e.g., drive parameters, vision system configurations, telemetry device parameters, safety zone definitions, etc.); or other such aspects of an industrial automation system being designed. IDE system 202 can identify the appropriate target devices 306 on which respective aspects of the system project 302 should be executed (e.g., industrial controllers, HMI terminals, variable frequency drives, safety devices, etc.), translate the system project 302 to executable files that can be executed on the respective target devices, and deploy the executable files to their corresponding target devices 306 for execution, thereby commissioning the system project 302 to the plant floor for implementation of the automation project.

Figure 4:
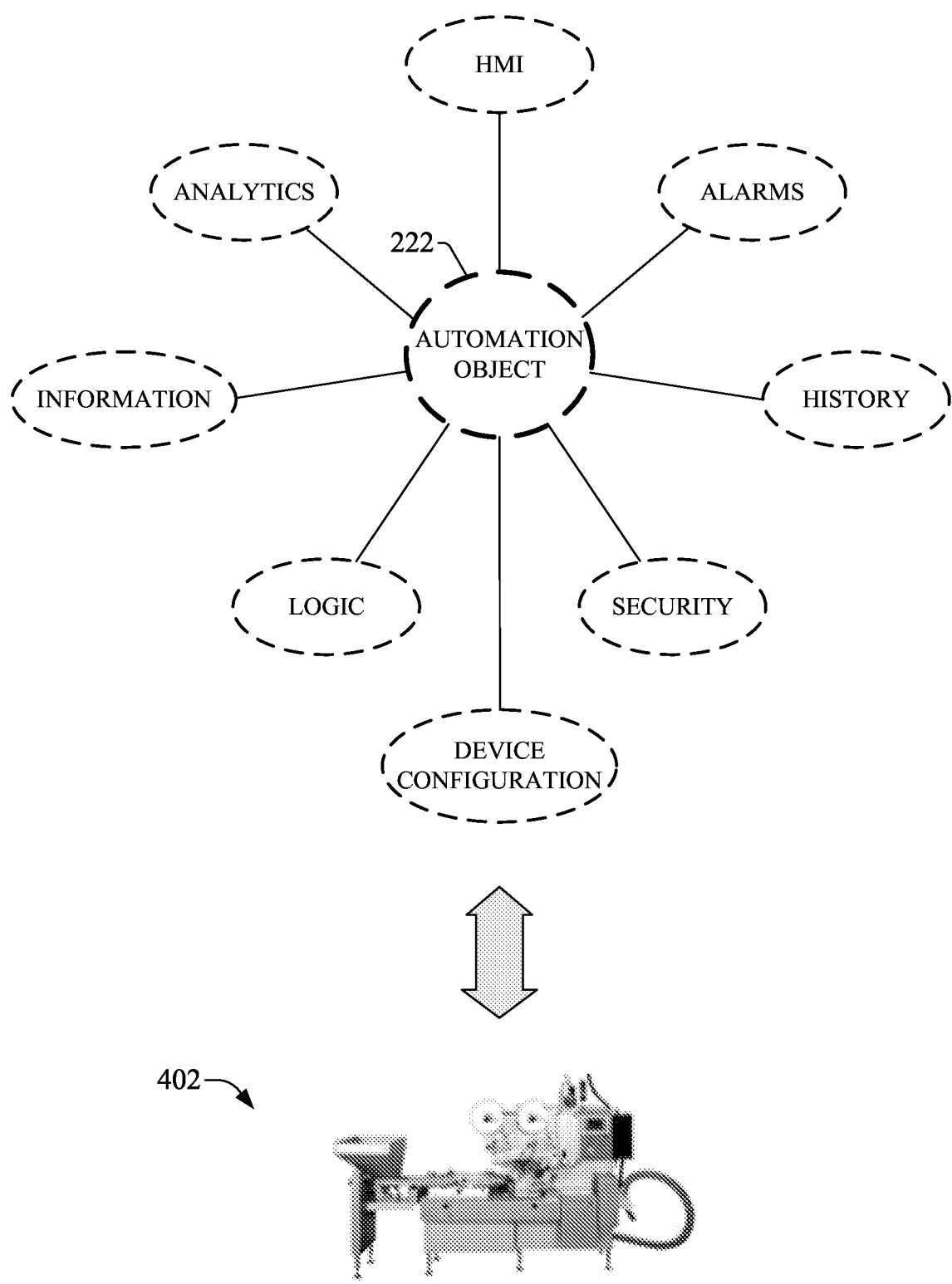
FIG. 4 is a diagram illustrating several example automation object properties that can be leveraged by an industrial IDE system in connection with building, deploying, and executing a system project.

To support enhanced development capabilities, some embodiments of IDE system 202 can be built on an object-based data model rather than, or in addition to, a tag-based architecture. Automation objects 222 serve as the building block for this object-based development architecture. FIG. 4 is a diagram illustrating several example automation object properties that can be leveraged by the IDE system 202 in connection with building, deploying, and executing a system project 302. Automation objects 222 can be created and augmented during design, integrated into larger data models, and consumed during runtime. These automation objects 222 provide a common data structure across the IDE system 202 and can be stored in an object library (e.g., part of memory 220) for reuse. The object library can store predefined automation objects 222 representing various classifications of real-world industrial assets 402, including but not limited to pumps, tanks, values, motors, motor drives (e.g., variable frequency drives), industrial robots, actuators (e.g., pneumatic or hydraulic actuators), or other such assets. Automation objects 222 can represent elements at substantially any level of an industrial enterprise, including individual devices, machines made up of many industrial devices and components (some of which may be associated with their own automation objects 222), and entire production lines or process control systems.

An automation object 222 for a given type of industrial asset can encode such aspects as 2D or 3D visualizations, alarms, control coding (e.g., logic or other type of control programming), analytics, startup procedures, testing protocols and scripts, validation reports, simulations, schematics, security protocols, and other such properties associated with the industrial asset 402 represented by the object 222. As will be described in more detail herein, an automation object 222 can also store device configuration settings for an industrial device as a sequence of mouse and keystroke interactions with a device profile configuration interface, such that these interactions can be played back to facilitate reproducing the device configuration for another device. Automation objects 222 can also be geotagged with location information identifying the location of the associated asset. During runtime of the system project 302, the automation object 222 corresponding to a given real-world asset 402 can also record status or operational history data for the asset. In general, automation objects 222 serve as programmatic representations of their corresponding industrial assets 402, and can be incorporated into a system project 302 as elements of control code, a 2D or 3D visualization, a knowledgebase or maintenance guidance system for the industrial assets, or other such aspects.

Figure 5:
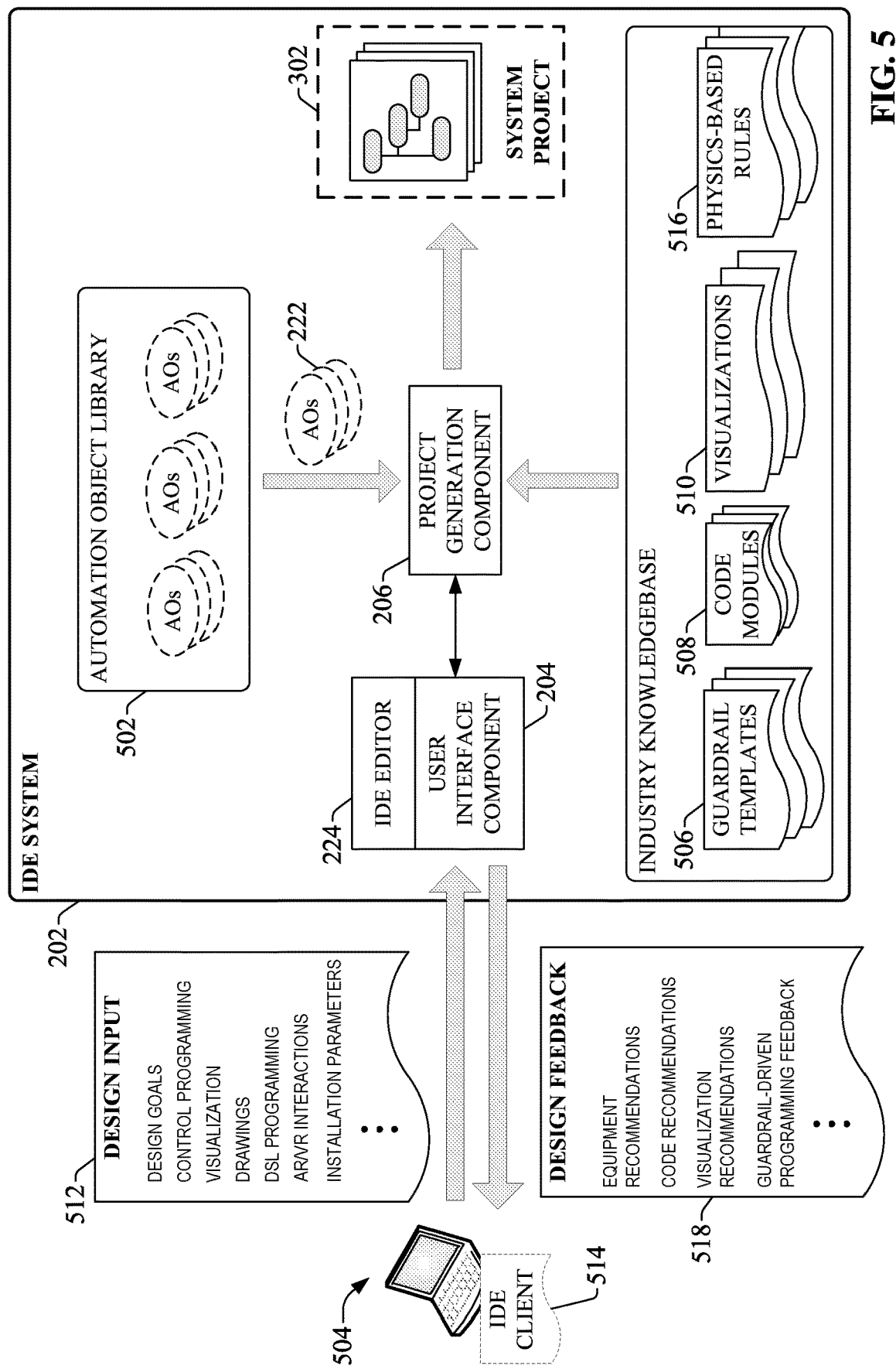
FIG. 5 is a diagram illustrating example data flows associated with creation of a system project for an automation system being designed using and industrial IDE system.

FIG. 5 is a diagram illustrating example data flows associated with creation of a system project 302 for an automation system being designed using IDE system 202 according to one or more embodiments. A client device 504 (e.g., a laptop computer, tablet computer, desktop computer, mobile device, wearable AR/VR appliance, etc.) executing an IDE client application 514 can access the IDE system's project development tools and leverage these tools to create a comprehensive system project 302 for an automation system being developed. Through interaction with the system's user interface component 204, developers can submit design input 512 to the IDE system 202 in various supported formats, including industry-specific control programming (e.g., control logic, structured text, sequential function charts, etc.) and HMI screen configuration input. Based on this design input 512 and information stored in an industry knowledgebase (predefined code modules 508 and visualizations 510, guardrail templates 506, physics-based rules 516, etc.), user interface component 204 renders design feedback 518 designed to assist the developer in connection with developing a system project 302 for configuration, control, and visualization of an industrial automation system.

In addition to control programming and visualization definitions, some embodiments of IDE system 202 can be configured to receive digital engineering drawings (e.g., computer-aided design (CAD) files) as design input 512. In such embodiments, project generation component 206 can generate portions of the system project 302—e.g., by automatically generating control and/or visualization code—based on analysis of existing design drawings. Drawings that can be submitted as design input 512 can include, but are not limited to, P&ID drawings, mechanical drawings, flow diagrams, or other such documents. For example, a P&ID drawing can be imported into the IDE system 202, and project generation component 206 can identify elements (e.g., tanks, pumps, etc.) and relationships therebetween conveyed by the drawings. Project generation component 206 can associate or map elements identified in the drawings with appropriate automation objects 222 corresponding to these elements (e.g., tanks, pumps, etc.) and add these automation objects 222 to the system project 302. The device-specific and asset-specific automation objects 222 include suitable code and visualizations to be associated with the elements identified in the drawings. In general, the IDE system 202 can examine one or more different types of drawings (mechanical, electrical, piping, etc.) to determine relationships between devices, machines, and/or assets (including identifying common elements across different drawings) and intelligently associate these elements with appropriate automation objects 222, code modules 508, and/or visualizations 510. The IDE system 202 can leverage physics-based rules 516 as well as pre-defined code modules 508 and visualizations 510 as necessary in connection with generating code or project data for system project 302.

The IDE system 202 can also determine whether pre-defined visualization content is available for any of the objects discovered in the drawings and generate appropriate HMI screens or AR/VR content for the discovered objects based on these pre-defined visualizations. To this end, the IDE system 202 can store industry-specific, asset-specific, and/or application-specific visualizations 510 that can be accessed by the project generation component 206 as needed. These visualizations 510 can be classified according to industry or industrial vertical (e.g., automotive, food and drug, oil and gas, pharmaceutical, etc.), type of industrial asset (e.g., a type of machine or industrial device), a type of industrial application (e.g., batch processing, flow control, web tension control, sheet metal stamping, water treatment, etc.), or other such categories. Predefined visualizations 510 can comprise visualizations in a variety of formats, including but not limited to HMI screens or windows, mashups that aggregate data from multiple pre-specified sources, AR overlays, VR objects representing 3D virtualizations of the associated industrial asset, or other such visualization formats. IDE system 202 can select a suitable visualization for a given object based on a predefined association between the object type and the visualization content.

Also, or in addition, some embodiments of IDE system 202 can support goal-based automated programming. For example, the user interface component 204 can allow the user to specify production goals for an automation system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 206 will generate portions of the system project 302 to satisfy the specified design goals and constraints. Portions of the system project 302 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control coding, or HMI screens suitable for visualizing the automation system being designed.

Some embodiments of the project generation component 206 can also generate at least some of the project code for system project 302 based on knowledge of parts that have been ordered for the project being developed. This can involve accessing the customer's account information maintained by an equipment vendor to identify devices that have been purchased for the project. Based on this information the project generation component 206 can add appropriate automation objects 222 and associated code modules 508 corresponding to the purchased assets, thereby providing a starting point for project development.

Some embodiments of project generation component 206 can also monitor customer-specific design approaches for commonly programmed functions (e.g., pumping applications, batch processes, palletizing operations, etc.) and generate recommendations for design modules (e.g., code modules 508, visualizations 510, etc.) that the user may wish to incorporate into a current design project based on an inference of the designer's goals and learned approaches to achieving the goal. To this end, some embodiments of project generation component 206 can be configured to monitor design input 512 over time and, based on this monitoring, learn correlations between certain design actions (e.g., addition of certain code modules or snippets to design projects, selection of certain visualizations, etc.) and types of industrial assets, industrial sequences, or industrial processes being designed. Project generation component 206 can record these learned correlations and generate recommendations during subsequent project development sessions based on these correlations. For example, if project generation component 206 determines, based on analysis of design input 512, that a designer is currently developing a control project involving a type of industrial equipment that has been programmed and/or visualized in the past in a repeated, predictable manner, the project generation component 206 can instruct user interface component 204 to render recommended development steps or code modules 508 the designer may wish to incorporate into the system project 302 based on how this equipment was configured and/or programmed in the past.

In some embodiments, IDE system 202 can also store and implement guardrail templates 506 that define design guardrails intended to ensure the project's compliance with internal or external design standards. Based on design parameters defined by one or more selected guardrail templates 506, user interface component 204 can provide, as a subset of design feedback 518, dynamic recommendations or other types of feedback designed to guide the developer in a manner that ensures compliance of the system project 302 with internal or external requirements or standards (e.g., certifications such as TUV certification, in-house design standards, industry-specific or vertical-specific design standards, etc.). This feedback 518 can take the form of text-based recommendations (e.g., recommendations to rewrite an indicated portion of control code to comply with a defined programming standard), syntax highlighting, error highlighting, auto-completion of code snippets, or other such formats. In this way, IDE system 202 can customize design feedback 518—including programming recommendations, recommendations of predefined code modules 508 or visualizations 510, error and syntax highlighting, etc.—in accordance with the type of industrial system being developed and any applicable in-house design standards.

Guardrail templates 506 can also be designed to maintain compliance with global best practices applicable to control programming or other aspects of project development. For example, user interface component 204 may generate and render an alert if a developer's control programing is deemed to be too complex as defined by criteria specified by one or more guardrail templates 506. Since different verticals (e.g., automotive, pharmaceutical, oil and gas, food and drug, marine, etc.) must adhere to different standards and certifications, the IDE system 202 can maintain a library of guardrail templates 506 for different internal and external standards and certifications, including customized user-specific guardrail templates 506. These guardrail templates 506 can be classified according to industrial vertical, type of industrial application, plant facility (in the case of custom in-house guardrail templates 506) or other such categories. During development, project generation component 206 can select and apply a subset of guardrail templates 506 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 206 can leverage guardrail templates 506 to implement rules-based programming, whereby programming feedback (a subset of design feedback 518) such as dynamic intelligent autocorrection, type-aheads, or coding suggestions are rendered based on encoded industry expertise and best practices (e.g., identifying inefficiencies in code being developed and recommending appropriate corrections).

Users can also run their own internal guardrail templates 506 against code provided by outside vendors (e.g., OEMs) to ensure that this code complies with in-house programming standards. In such scenarios, vendor-provided code can be submitted to the IDE system 202, and project generation component 206 can analyze this code in view of in-house coding standards specified by one or more custom guardrail templates 506. Based on results of this analysis, user interface component 204 can indicate portions of the vendor-provided code (e.g., using highlights, overlaid text, etc.) that do not conform to the programming standards set forth by the guardrail templates 506, and display suggestions for modifying the code in order to bring the code into compliance. As an alternative or in addition to recommending these modifications, some embodiments of project generation component 206 can be configured to automatically modify the code in accordance with the recommendations to bring the code into conformance.

In making coding suggestions as part of design feedback 518, project generation component 206 can invoke selected code modules 508 stored in a code module database or selected automation objects 222 stored in an automation object library 502 (e.g., on memory 220). Code modules 508 comprise standardized coding segments for controlling common industrial tasks or applications (e.g., palletizing, flow control, web tension control, pick-and-place applications, conveyor control, etc.). Similarly, automation objects 222 representing respective industrial assets may have associated therewith standardize control code for monitoring and controlling their respective assets. In some embodiments, code modules 508 and/or automation objects 222 can be categorized according to one or more of an industrial vertical (e.g., automotive, food and drug, oil and gas, textiles, marine, pharmaceutical, etc.), an industrial application, or a type of machine or device to which the code module 508 or automation object 222 is applicable.

In some embodiments, project generation component 206 can infer a programmer's current programming task or design goal based on programmatic input being provided by the programmer (as a subset of design input 512), and determine, based on this task or goal, whether one of the pre-defined code modules 508 or automation objects 222 may be appropriately added to the control program being developed to achieve the inferred task or goal. For example, project generation component 206 may infer, based on analysis of design input 512, that the programmer is currently developing control code for transferring material from a first tank to another tank, and in response, recommend inclusion of a predefined code module 508 comprising standardized or frequently utilized code for controlling the valves, pumps, or other assets necessary to achieve the material transfer. Similarly, the project generation component 206 may recommend inclusion of an automation object 222 representing one of the tanks, or one of the other industrial assets involved in transferring the material (e.g., a valve, a pump, etc.), where the recommended automation object 222 includes associated control code for controlling its associated asset as well as a visualization object that can be used to visualize the asset on an HMI application or another visualization application.

Customized guardrail templates 506 can also be defined to capture nuances of a customer site that should be taken into consideration in the project design. For example, a guardrail template 506 could record the fact that the automation system being designed will be installed in a region where power outages are common, and will factor this consideration when generating design feedback 518; e.g., by recommending implementation of backup uninterruptable power supplies and suggesting how these should be incorporated, as well as recommending associated programming or control strategies that take these outages into account.

IDE system 202 can also use guardrail templates 506 to guide user selection of equipment or devices for a given design goal; e.g., based on the industrial vertical, type of control application (e.g., sheet metal stamping, die casting, palletization, conveyor control, web tension control, batch processing, etc.), budgetary constraints for the project, physical constraints at the installation site (e.g., available floor, wall or cabinet space; dimensions of the installation space; etc.), equipment already existing at the site, etc. Some or all of these parameters and constraints can be provided as design input 512, and user interface component 204 can render the equipment recommendations as a subset of design feedback 518. In conjunction with this equipment recommendation, the project generation component 206 can also recommend inclusion of corresponding automation objects 222 representing the recommended equipment for inclusion in the system project 302.

In some embodiments, project generation component 206 can also determine whether some or all existing equipment can be repurposed for the new control system being designed. For example, if a new bottling line is to be added to a production area, there may be an opportunity to leverage existing equipment since some bottling lines already exist. The decision as to which devices and equipment can be reused will affect the design of the new control system. Accordingly, some of the design input 512 provided to the IDE system 202 can include specifics of the customer's existing systems within or near the installation site. In some embodiments, project generation component 206 can apply artificial intelligence (AI) or traditional analytic approaches to this information to determine whether existing equipment specified in design in put 512 can be repurposed or leveraged. Based on results of this analysis, project generation component 206 can generate, as design feedback 518, a list of any new equipment that may need to be purchased based on these decisions.

In some embodiments, IDE system 202 can offer design recommendations based on an understanding of the physical environment within which the automation system being designed will be installed. To this end, information regarding the physical environment can be submitted to the IDE system 202 (as part of design input 512) in the form of 2D or 3D images or video of the plant environment. This environmental information can also be obtained from an existing digital twin of the plant, or by analysis of scanned environmental data obtained by a wearable AR appliance in some embodiments. Project generation component 206 can analyze this image, video, or digital twin data to identify physical elements within the installation area (e.g., walls, girders, safety fences, existing machines and devices, etc.) and physical relationships between these elements. This can include ascertaining distances between machines, lengths of piping runs, locations and distances of wiring harnesses or cable trays, etc. Based on results of this analysis, project generation component 206 can add context to schematics generated as part of system project 302, generate recommendations regarding optimal locations for devices or machines (e.g., recommending a minimum separation between power and data cables), or make other refinements to the system project 302. At least some of this design data can be generated based on physics-based rules 516, which can be referenced by project generation component 206 to determine such physical design specifications as minimum safe distances from hazardous equipment (which may also factor into determining suitable locations for installation of safety devices relative to this equipment, given expected human or vehicle reaction times defined by the physics-based rules 516), material selections capable of withstanding expected loads, piping configurations and tuning for a specified flow control application, wiring gauges suitable for an expected electrical load, minimum distances between signal wiring and electromagnetic field (EMF) sources to ensure negligible electrical interference on data signals, or other such design features that are dependent on physical rules.

In an example use case, relative locations of machines and devices specified by physical environment information submitted to the IDE system 202 can be used by the project generation component 206 to generate design data for an industrial safety system. For example, project generation component 206 can analyze distance measurements between safety equipment and hazardous machines and, based on these measurements, determine suitable placements and configurations of safety devices and associated safety controllers that ensure the machine will shut down within a sufficient safety reaction time to prevent injury (e.g., in the event that a person runs through a light curtain).

Figure 6:
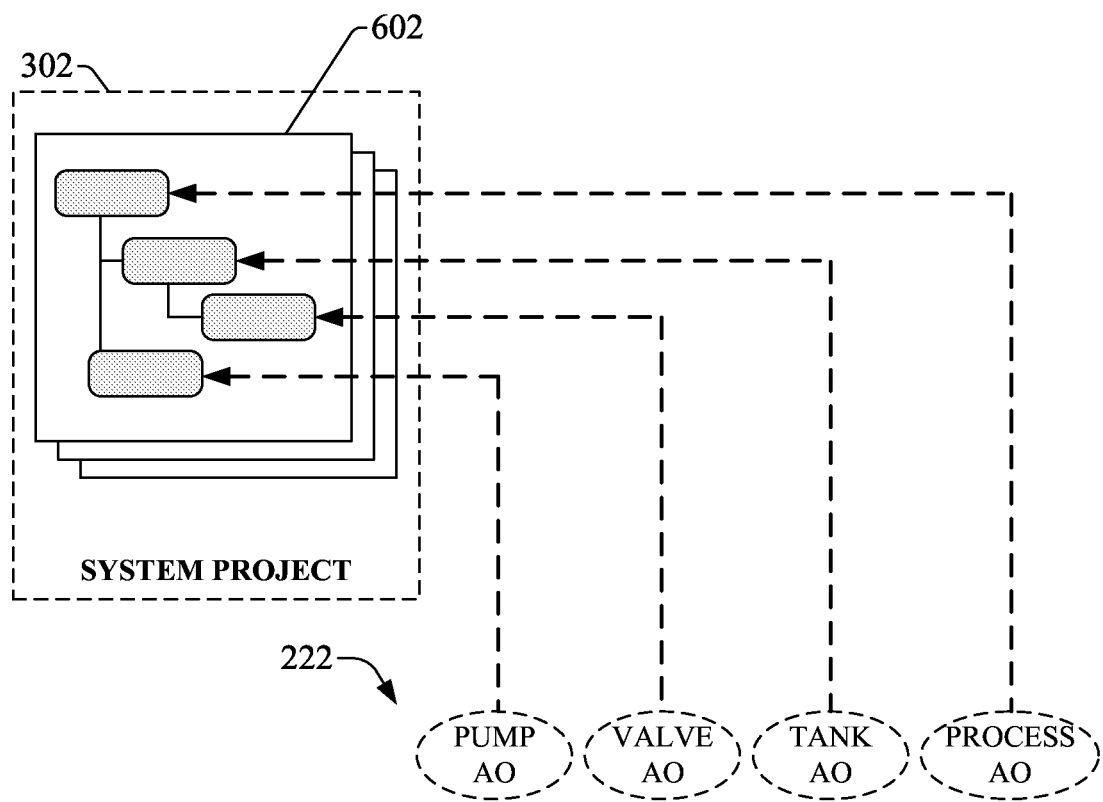
FIG. 6 is a diagram illustrating an example system project that incorporates automation objects into a project model.

As noted above, the system project 302 generated by IDE system 202 for a given automaton system being designed can be built upon an object-based architecture that uses automation objects 222 as building blocks. FIG. 6 is a diagram illustrating an example system project 302 that incorporates automation objects 222 into the project model. In this example, various automation objects 222 representing analogous industrial devices, systems, or assets of an automation system (e.g., a process, tanks, valves, pumps, etc.) have been incorporated into system project 302 as elements of a larger project data model 602. The project data model 602 also defines hierarchical relationships between these automation objects 222. According to an example relationship, a process automation object representing a batch process may be defined as a parent object to a number of child objects representing devices and equipment that carry out the process, such as tanks, pumps, and valves. Each automation object 222 has associated therewith object properties or attributes specific to its corresponding industrial asset (e.g., those discussed above in connection with FIG. 4), including executable control programming for controlling the asset (or for coordinating the actions of the asset with other industrial assets) and visualizations that can be used to render relevant information about the asset during runtime.

At least some of the attributes of each automation object 222 are default properties defined by the IDE system 202 based on encoded industry expertise pertaining to the asset represented by the objects. These default properties can include, for example, industry-standard or recommended control code for monitoring and controlling the asset represented by the automation object 222, a 2D or 3D graphical object that can be used to visualize operational or statistical data for the asset, alarm conditions associated with the asset, analytic or reporting scripts designed to yield actionable insights into the asset's behavior, or other such properties. Other properties can be modified or added by the developer as needed (via design input 512) to customize the automation object 222 for the particular asset and/or industrial application for which the system projects 302 is being developed. This can include, for example, associating customized control code, HMI screens, AR presentations, or help files associated with selected automation objects 222. In this way, automation objects 222 can be created and augmented as needed during design for consumption or execution by target control devices during runtime.

Figure 7:
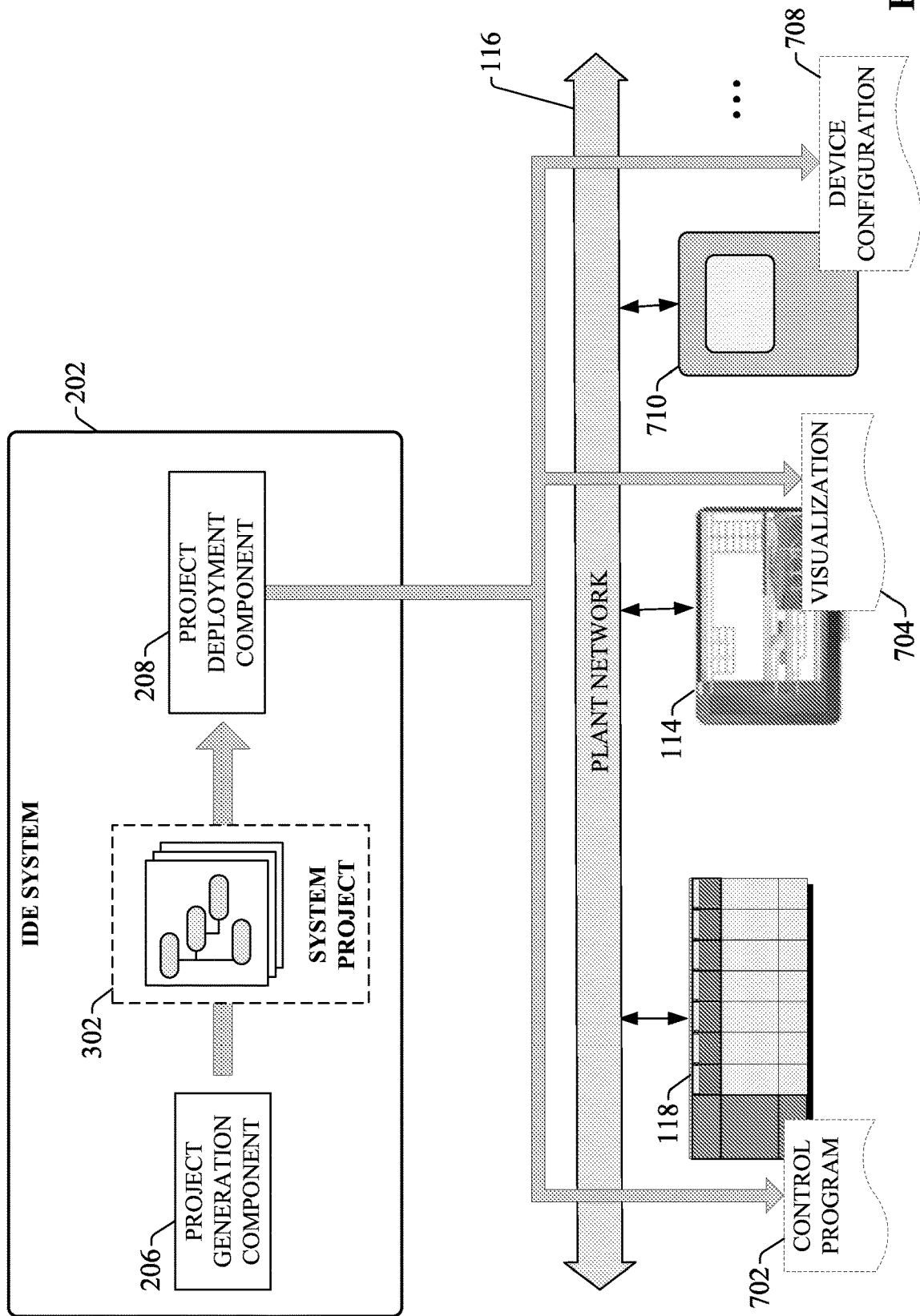
FIG. 7 is a diagram illustrating commissioning of a system project.

Once development and testing on a system project 302 has been completed, commissioning tools supported by the IDE system 202 can simplify the process of commissioning the project in the field. When the system project 302 for a given automation system has been completed, the system project 302 can be deployed to one or more target control devices for execution. FIG. 7 is a diagram illustrating commissioning of a system project 302. Project deployment component 208 can compile or otherwise translate a completed system project 302 into one or more executable files or configuration files that can be stored and executed on respective target industrial devices of the automation system (e.g., industrial controllers 118, HMI terminals 114 or other types of visualization systems, motor drives 710, telemetry devices, vision systems, safety relays, etc.).

Conventional control program development platforms require the developer to specify the type of industrial controller (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDE system 202 can abstract project development from the specific controller type, allowing the designer to develop the system project 302 as a logical representation of the automation system in a manner that is agnostic to where and how the various control aspects of system project 302 will run. Once project development is complete and system project 302 is ready for commissioning, the user can specify (via user interface component 204) target devices on which respective aspects of the system project 302 are to be executed. In response, an allocation engine of the project deployment component 208 will translate aspects of the system project 302 to respective executable files formatted for storage and execution on their respective target devices.

For example, system project 302 may include—among other project aspects—control code, visualization screen definitions, and motor drive parameter definitions. Upon completion of project development, a user can identify which target devices—including an industrial controller 118, an HMI terminal 114, and a motor drive 710—are to execute or receive these respective aspects of the system project 302. Project deployment component 208 can then translate the controller code defined by the system project 302 to a control program file 702 formatted for execution on the specified industrial controller 118 and send this control program file 702 to the controller 118 (e.g., via plant network 116). Similarly, project deployment component 208 can translate the visualization definitions and motor drive parameter definitions to a visualization application 704 and a device configuration file 708, respectively, and deploy these files to their respective target devices for execution and/or device configuration.

In general, project deployment component 208 performs any conversions necessary to allow aspects of system project 302 to execute on the specified devices. Any inherent relationships, handshakes, or data sharing defined in the system project 302 are maintained regardless of how the various elements of the system project 302 are distributed. In this way, embodiments of the IDE system 202 can decouple the project from how and where the project is to be run. This also allows the same system project 302 to be commissioned at different plant facilities having different sets of control equipment. That is, some embodiments of the IDE system 202 can allocate project code to different target devices as a function of the particular devices found on-site.

IDE system 202 can also allow some portions of the project file to be commissioned as an emulator or on a cloud-based controller.

As an alternative to having the user specify the target control devices to which the system project 302 is to be deployed, some embodiments of IDE system 202 can actively connect to the plant network 116 and discover available devices, ascertain the control hardware architecture present on the plant floor, infer appropriate target devices for respective executable aspects of system project 302, and deploy the system project 302 to these selected target devices. As part of this commissioning process, IDE system 202 can also connect to remote knowledgebases (e.g., web-based or cloud-based knowledgebases) to determine which discovered devices are out of date or require firmware upgrade to properly execute the system project 302. In this way, the IDE system 202 can serve as a link between device vendors and a customer's plant ecosystem via a trusted connection in the cloud.

Copies of system project 302 can be propagated to multiple plant facilities having varying equipment configurations using smart propagation, whereby the project deployment component 208 intelligently associates project components with the correct industrial asset or control device even if the equipment on-site does not perfectly match the defined target (e.g., if different pump types are found at different sites). For target devices that do not perfectly match the expected asset, project deployment component 208 can calculate the estimated impact of running the system project 302 on non-optimal target equipment and generate warnings or recommendations for mitigating expected deviations from optimal project execution.

Figure 8:
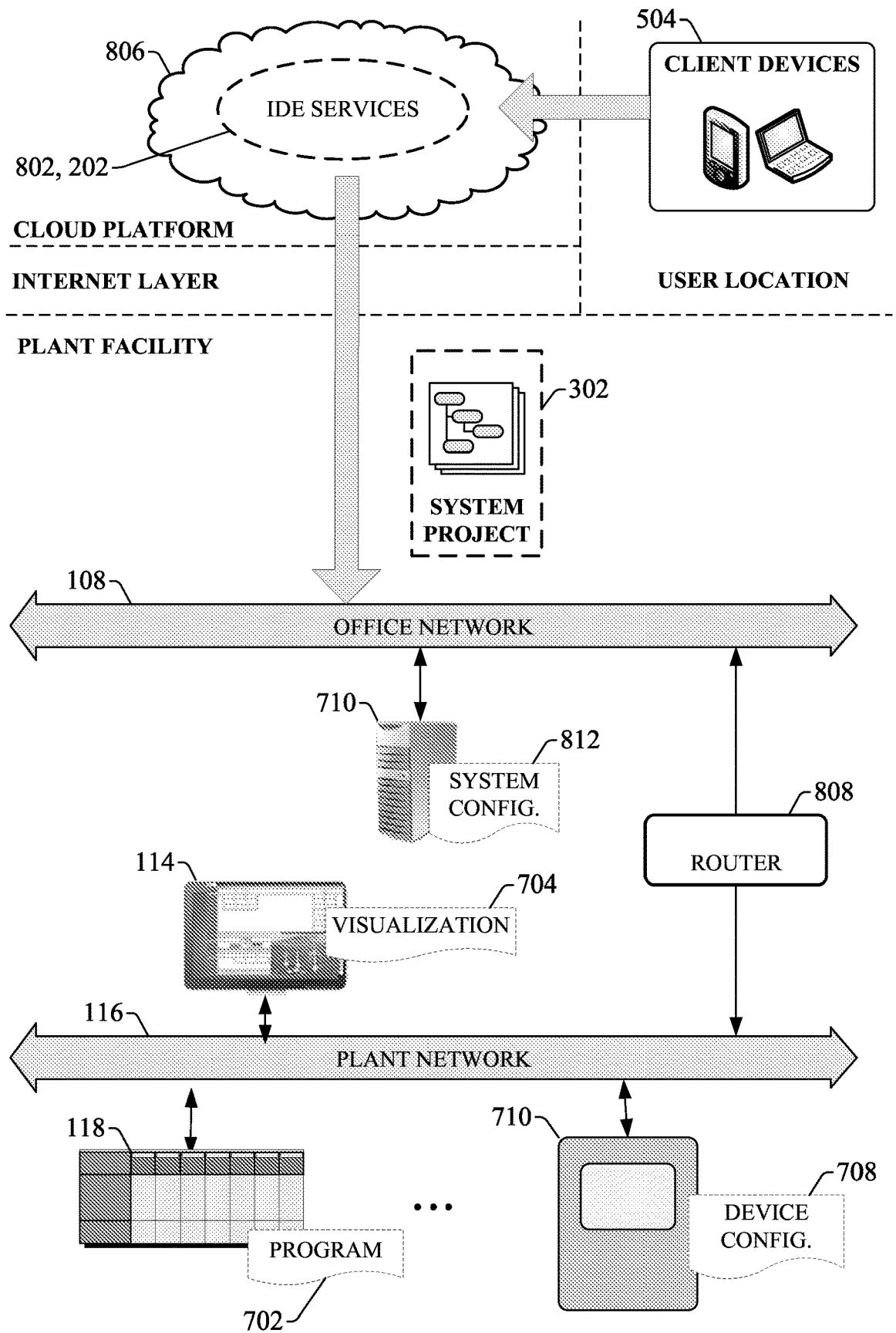
FIG. 8 is a diagram illustrating an example architecture in which cloud-based IDE services are used to develop and deploy industrial applications to a plant environment.

As noted above, some embodiments of IDE system 202 can be embodied on a cloud platform. FIG. 8 is a diagram illustrating an example architecture in which cloud-based IDE services 802 are used to develop and deploy industrial applications to a plant environment. In this example, the industrial environment includes one or more industrial controllers 118, HMI terminals 114, motor drives 710, servers 801 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 810 reside on a separate office network 108 that is connected to the plant network 116 (e.g., through a router 808 or other network infrastructure device).

In this example, IDE system 202 resides on a cloud platform 806 and executes as a set of cloud-based IDE service 802 that are accessible to authorized remote client devices 504. Cloud platform 806 can be any infrastructure that allows shared computing services (such as IDE services 802) to be accessed and utilized by cloud-capable devices. Cloud platform 806 can be a public cloud accessible via the Internet by devices 504 having Internet connectivity and appropriate authorizations to utilize the IDE services 802. In some scenarios, cloud platform 806 can be provided by a cloud provider as a platform-as-a-service (PaaS), and the IDE services 802 can reside and execute on the cloud platform 806 as a cloud-based service. In some such configurations, access to the cloud platform 806 and associated IDE services 802 can be provided to customers as a subscription service by an owner of the IDE services 802. Alternatively, cloud platform 806 can be a private cloud operated internally by the industrial enterprise (the owner of the plant facility). An example private cloud platform can comprise a set of servers hosting the IDE services 802 and residing on a corporate network protected by a firewall.

Cloud-based implementations of IDE system 202 can facilitate collaborative development by multiple remote developers who are authorized to access the IDE services 802. When a system project 302 is ready for deployment, the project 302 can be commissioned to the plant facility via a secure connection between the office network 108 or the plant network 116 and the cloud platform 806. As discussed above, the industrial IDE services 802 can translate system project 302 to one or more appropriate executable files—control program files 702, visualization applications 704, device configuration files 708, system configuration files 812—and deploy these files to the appropriate devices in the plant facility to facilitate implementation of the automation project.

Figure 9:
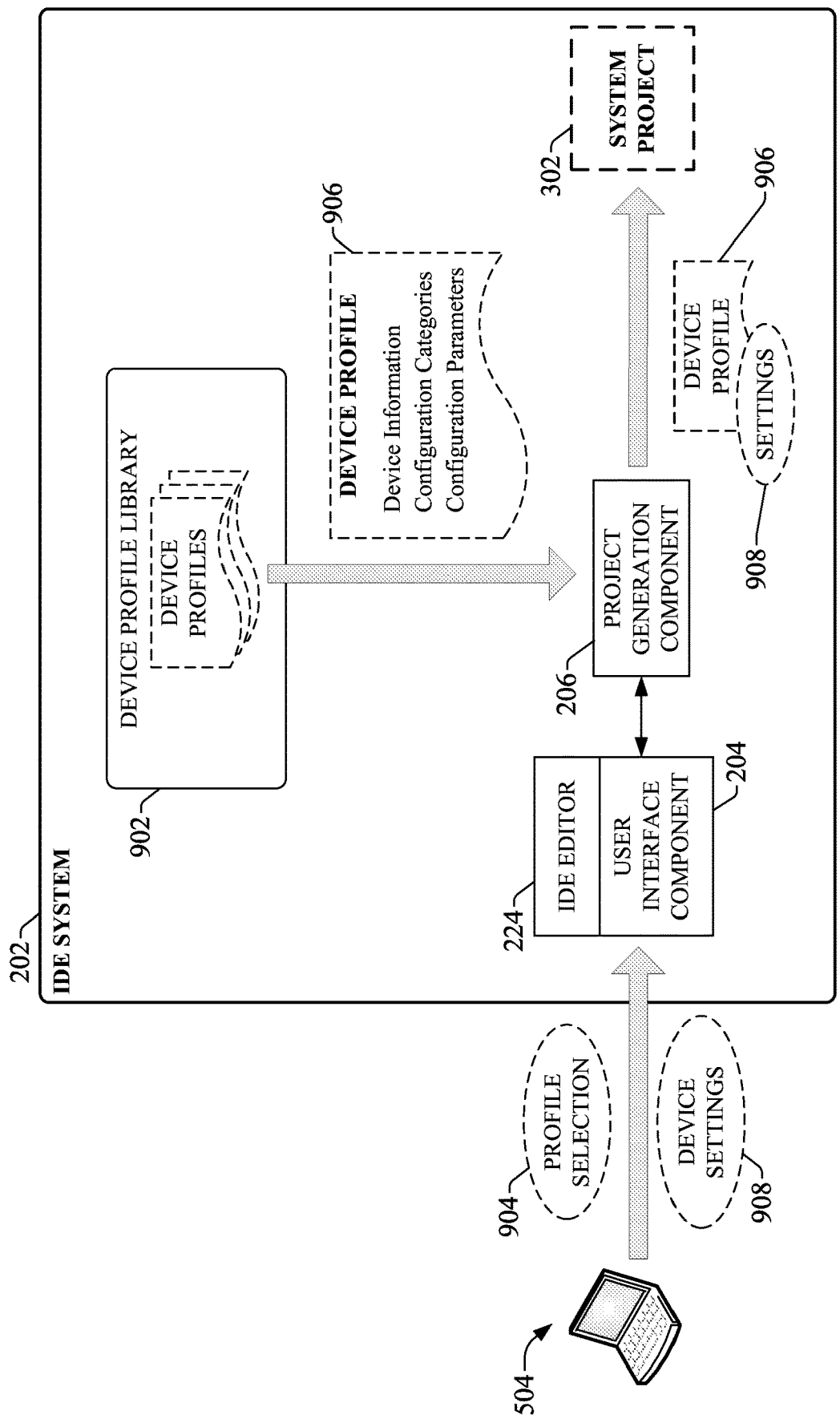
FIG. 9 is a diagram illustrating selection of device profiles from a profile library for inclusion in a system project.

Some embodiments of the industrial IDE system 202 can support the use of device profiles to facilitate setting values of configurable device parameters for devices that are to be included in the automation project. FIG. 9 is a diagram illustrating configuration of device parameters using device profiles 906. In general, each device profile 906 corresponds to a device type, and is a re-usable object or file that defines a set of configurable device parameters—e.g., network or communication settings, scale factors, input or output signal types, operating mode settings, tuning parameter values, maximum or minimum values, refresh rates, channel configurations, etc.—for its corresponding device type. Each device profile 906 can organize these device configuration parameters into categories to assist the user in locating a desired parameter. The device profile 906 can also record general information about the device, some of which can be modified by the user to customize a generic device type to reflect a specific device (an instance of the device type).

The IDE system 202 can store device profiles 906 for multiple types of devices in a device profile library 902 for selective inclusion in system projects 302. Device profiles 906 can be defined for a variety of different industrial devices or systems, including but not limited to industrial controller modules (e.g., analog or digital input and output modules, networking or scanner modules, special function modules, etc.), variable frequency drives, telemetry devices, safety relays, vision systems, or other such devices.

As illustrated in FIG. 9, during development of a system project 302, a user can interact with the IDE system's development interface to select a device profile 906 to be added to the project 302. The selected profile 906 typically corresponds to a type of device that will be included in the automation system for which the project 302 is being developed. Once a selected device profile 906 has been added to the system project 302 (via submission of profile selection input 904), the user can invoke device configuration interfaces defined by the device profile 906 and interact with these configuration interfaces to set values of device parameters or settings 908 for the device represented by the profile 906. When the system project 302 is subsequently deployed to the industrial controller 118 or other devices that make up the automation system (as illustrated in FIGS. 7 and 8), the device configuration settings 908 that had been submitted by the user are written to corresponding registers of the relevant field devices (e.g., the industrial controller 118 in the case of I/O modules or smart devices connected to the controller 118, or other target devices that are subject to the device settings).

Figure 10:
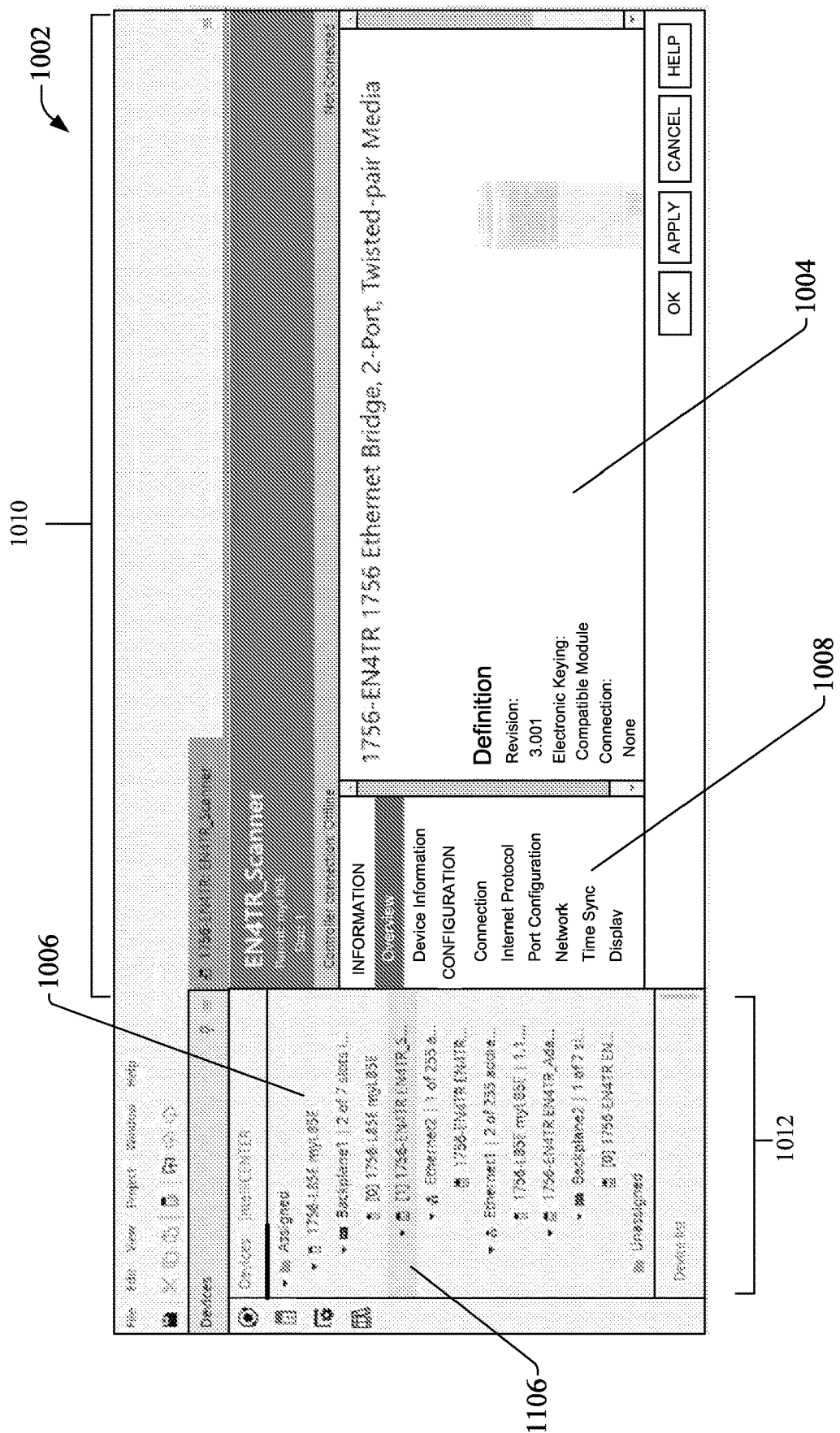
FIG. 10 is an example device profile interface that can be rendered on a client device by an industrial IDE.

FIG. 10 is an example development interface 1002 that can be rendered on a client device by the industrial IDE system's user interface component 204. Development interface 1002 is organized into panels and workspaces for navigating and editing the system project 302. The example interface 1002 depicted in FIG. 10 comprises a main workspace area 1010 that serves as the IDE system's primary work area and an explorer panel 1012 located adjacent to the main workspace area 1010. The explorer panel 1012 displays a navigation tree 1006 comprising a hierarchical arrangement of selectable nodes representing elements of the system project 302 being developed. In general, selection of a project element from the navigation tree 1006 causes the main workspace area 1010 to render project content corresponding to the selected element, such as ladder logic or other types of control code, program routines, controller tag definitions, device configuration information, or other aspects of the project 302. The user can interact with these project elements within the main workspace area 1010 to perform such development functions as writing or editing controller code (e.g., ladder logic, function block diagrams, structured text, etc.), configuring device parameter settings, defining controller tags, or other such project development functions.

Figure 11:
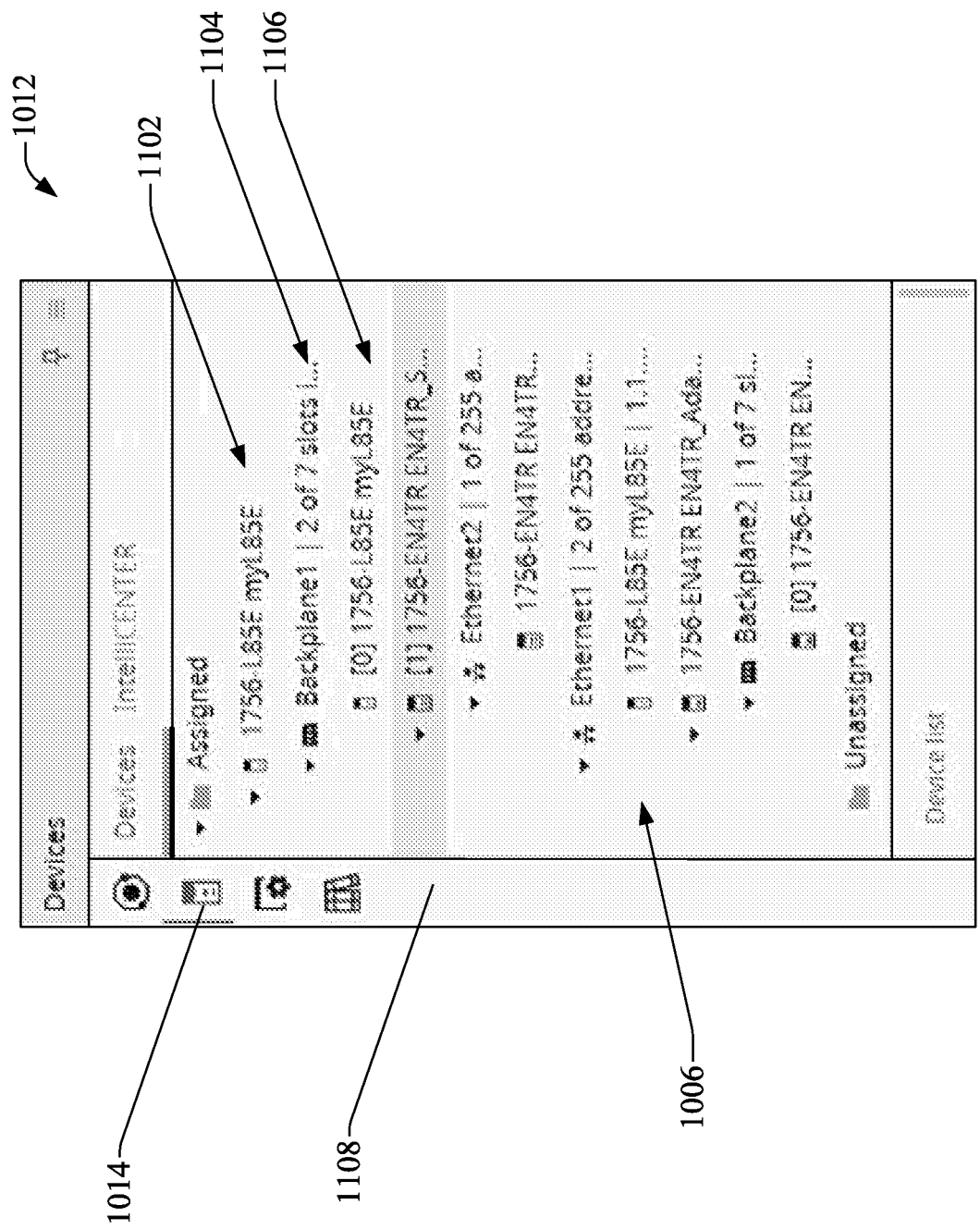
FIG. 11 is a view of a device profile interface explorer panel and its associated navigation tree.

FIG. 11 is a view of the explorer panel 1012 and its associated navigation tree 1006 in isolation. As noted above, explorer panel 1012 serves as a means for navigating and viewing content of a system project 302 and supports various ways for performing this navigation. Selectable viewing categories are rendered as selectable explorer icons in a control bar 1108 pinned to the left-side edge of the explorer panel 1012. Selection of an explorer icon from the control bar 1108 sets the type of project content to be browsed via the Explorer panel 1012. In the scenario depicted in FIG. 11, a Devices view icon 1014 has been selected in the control bar 1108, causing the explorer panel 1012 to display, as the navigation tree 1006, a hierarchical arrangement of device nodes 1106 representing the devices defined for the system project 302.

For an example system project 302, the device navigation tree 1006 can include a controller node 1102 representing an industrial controller 118 to be programmed as part of the system project 302. A backplane node 1104 is defined as a child node of the controller node 1102 and represents the backplane of the industrial controller 118 on which one or more devices or modules will be installed. Any modules or devices to be connected to the controller's backplane are represented as device nodes 1106 below the backplane node 1104. Example devices that can be associated with the controller can include, but are not limited to, digital or analog input modules, digital or analog output modules, networking or scanning modules, analytic modules, special function modules, smart industrial devices, motor drives such as variable frequency drives, or other such devices. Per the workflow illustrated in FIG. 9, a user can add a new device to the project by adding a new device node 1106—representing a device profile 906 for the type of the device—to the device navigation tree 1006. Any suitable interaction can be used to add a new device to the navigation tree 1006. For example, the user may select the backplane node 1104 and invoke a device profile selection window (e.g., by right-clicking on the backplane node 1104) that displays a list of available types of devices that can be added to the project 302. Each device type has a corresponding device profile 906 stored in the system's device profile library 902. The device profile 906 defines information about the corresponding device type, as well as any device parameters associated with the device type whose values can be set by the user.

The explorer icons rendered on the control bar 1108 can also include an Application icon that causes the explorer panel 1012 to display a list of applications—e.g., industrial control programs such as ladder logic routines—that make up the system project 302. This viewing mode allows the user to develop, view, and edit control programs within the main workspace area 1010. These control programs will be installed and executed on the industrial controller 118.

Returning to FIG. 10, selecting a device node 1106 in the navigation tree 1006 causes the main workspace area 1010 to display an interactive device configuration interface for viewing and editing configuration parameters for the selected device. Device information and configurable device parameters displayed on this device configuration interface are defined by the device profile 906 for the selected device. In the example depicted in FIG. 10, the device configuration interface comprises a main configuration area 1004 and a category window 1008 that lists various informational and configuration categories for the device. Selecting a category from this window 1008 causes the main device configuration area 1004 to render information or configurable device parameters relating to the selected category.

Informational categories listed in the category window 1008 can include an Overview category and a more detailed Device Information category. Selection of the Overview category can cause summary information about the device—e.g., model number and revision number of the device, device type, a type of electronic keying, or other such information—to be rendered in the main workspace area 1010. In the example depicted in FIG. 10, the user has selected a device node 1106 representing an ethernet bridge module that will be installed on the controller's backplane, and has selected the Overview category within the category window 1008 so that general overview information for the module can be viewed.

Figure 12:
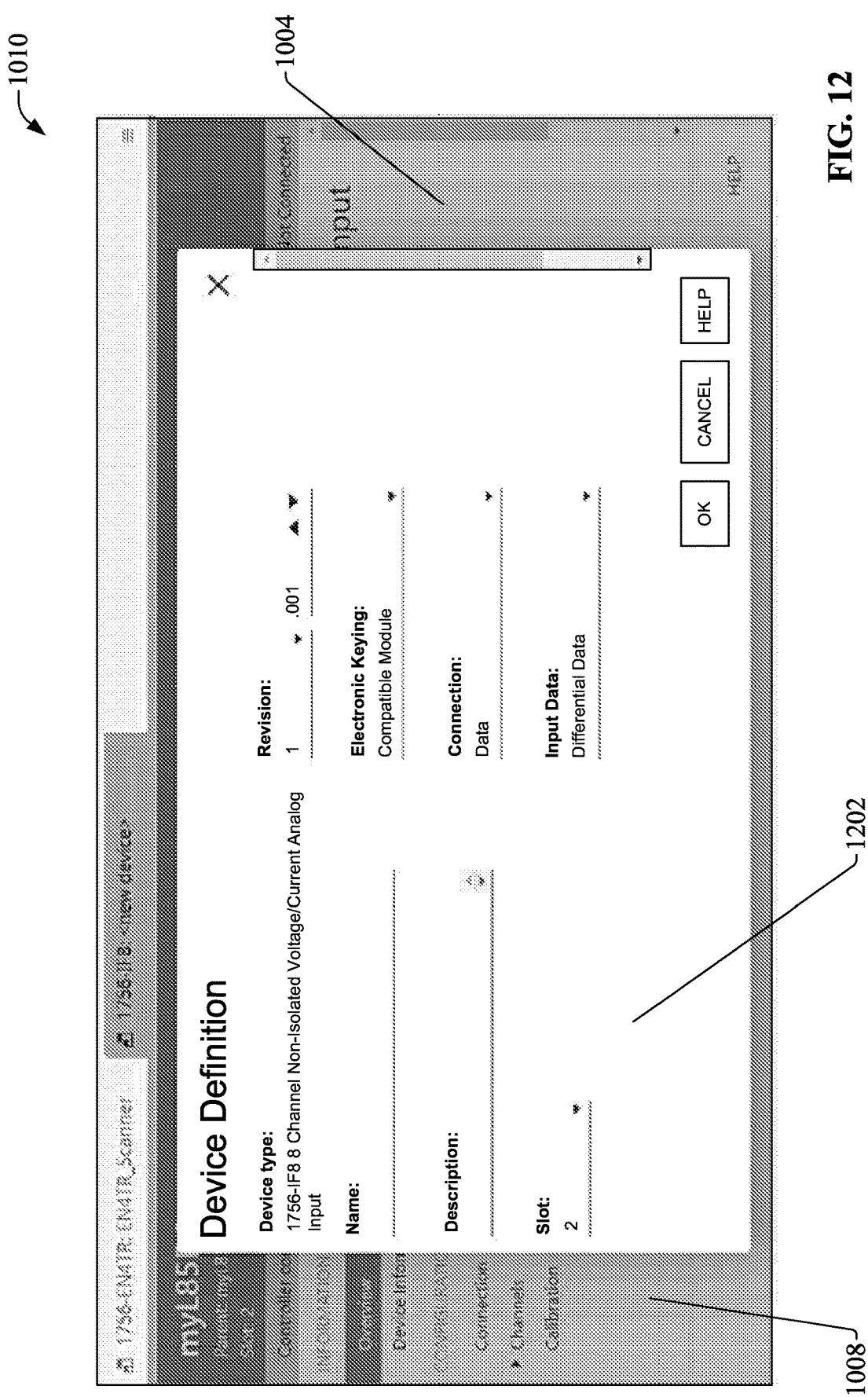
FIG. 12 is a view of the main workspace area of a device profile interface in which a Device Information editing window has been invoked for the selected device.

Depending on the type of device, some of the device information accessible via the Overview or Device Information categories can be edited by the user. FIG. 12 is a view of the main workspace area 1010 in which a Device Information editing window 1202 has been invoked for the selected device. This window 1202 includes data fields that allow the user to enter or edit various items of information about the device, including but not limited to a name of the device, a description of the device, a controller slot number in which the device is to be installed (if the device is a module to be installed on a controller backplane), revision information, a type of electronic keying, a type of connection, a type of input data, or other such information.

Figure 13A:
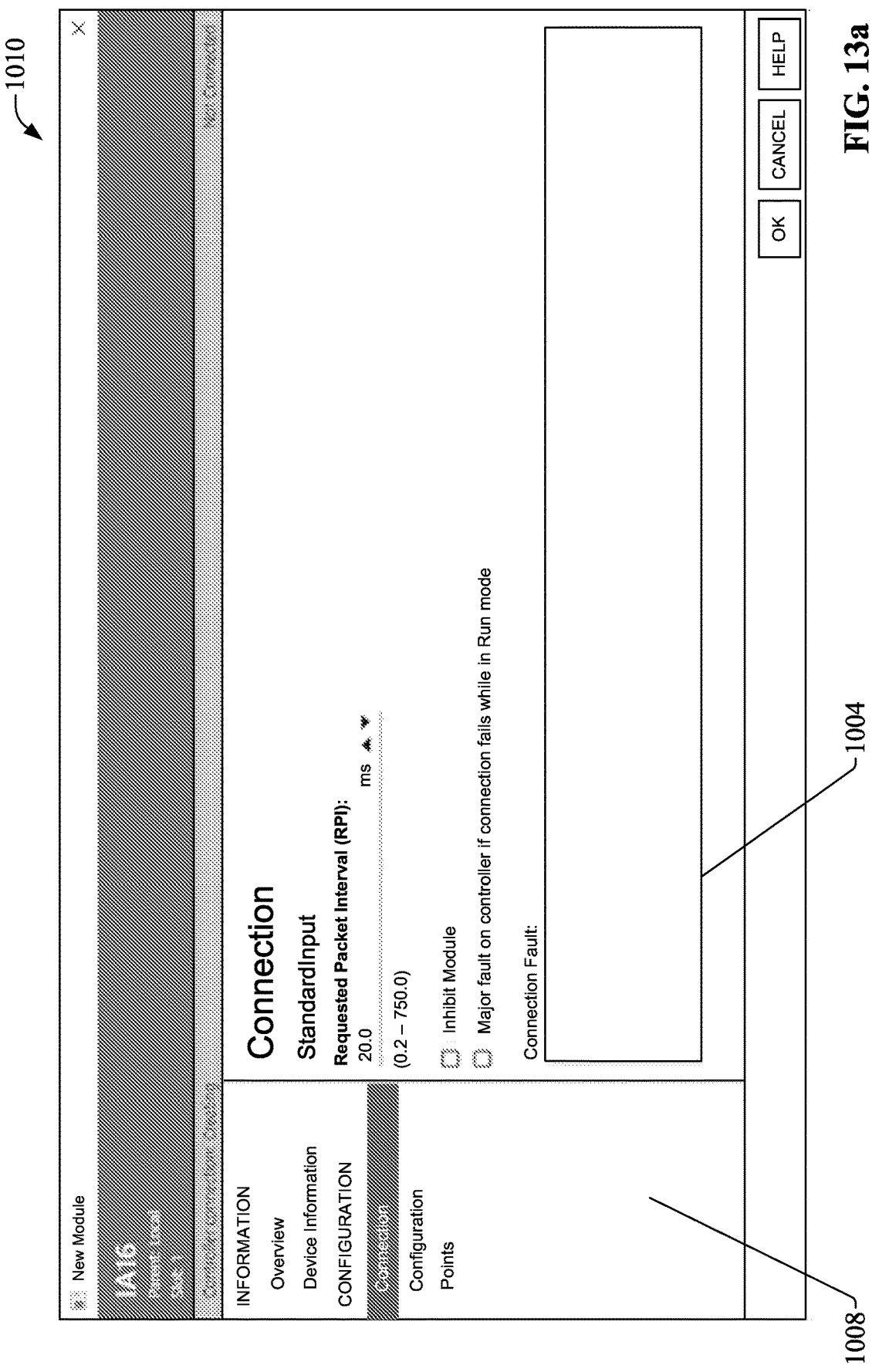
FIG. 13a is a view of a main workspace area of a device profile interface in which the user has selected a 16-point digital input module.

Returning again to FIG. 10, configuration categories listed in the category window 1008 can include, for example, a Connection category, an Internet Protocol category, a Port Configuration category, a Network category, a Time Sync category, a Display category, a Channels category, a Calibration category, an I/O points category, or other such configuration categories. The available configuration categories, as well as the specific parameters that are accessible under each category, can depend on the type of device being viewed. For example, FIG. 13*a* is a view of the main workspace area 1010 in which the user has selected a 16-point digital input module. Available configuration categories listed in the Category window 1008 for this type of device include a Connection category, a Configuration category, and a Points category. The Connection category has been selected in FIG. 13, causing the configuration area 1004 to display configurable connection parameters for the module. These parameters include a packet interval timing, an indication as to whether the module is to be inhibited, and an indication as to whether a connection failure is to trigger a major fault on the controller 118. The configuration area renders interactive graphical controls—e.g., data entry boxes, drop down selection windows, binary check boxes, etc.—for each configurable parameter to allow the user to enter values of these parameters.

Figure 13B:
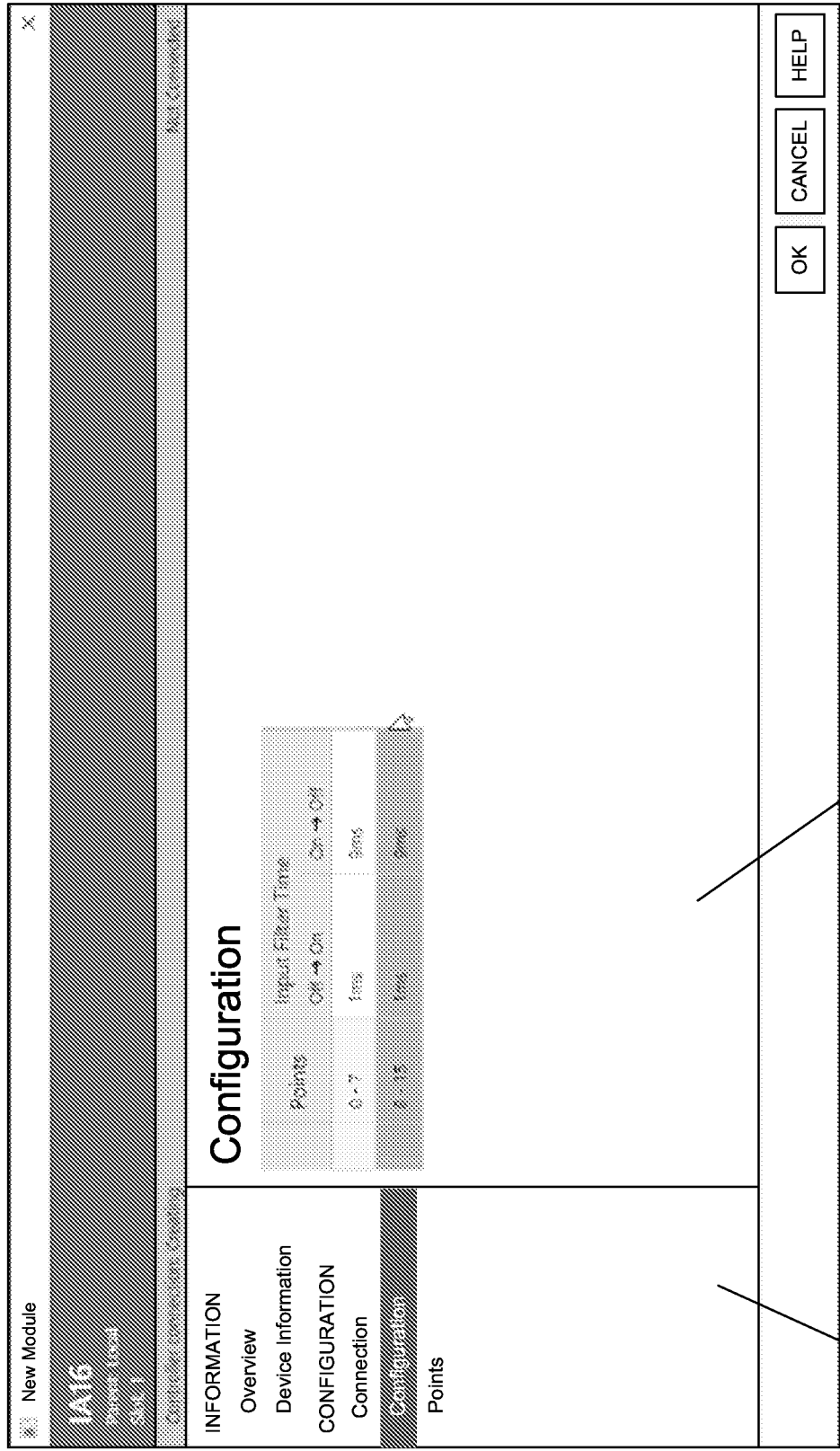
FIG. 13b is a view of the main workspace area of a device profile interface in which the Configuration category has been selected in the Category window.
Figure 13C:
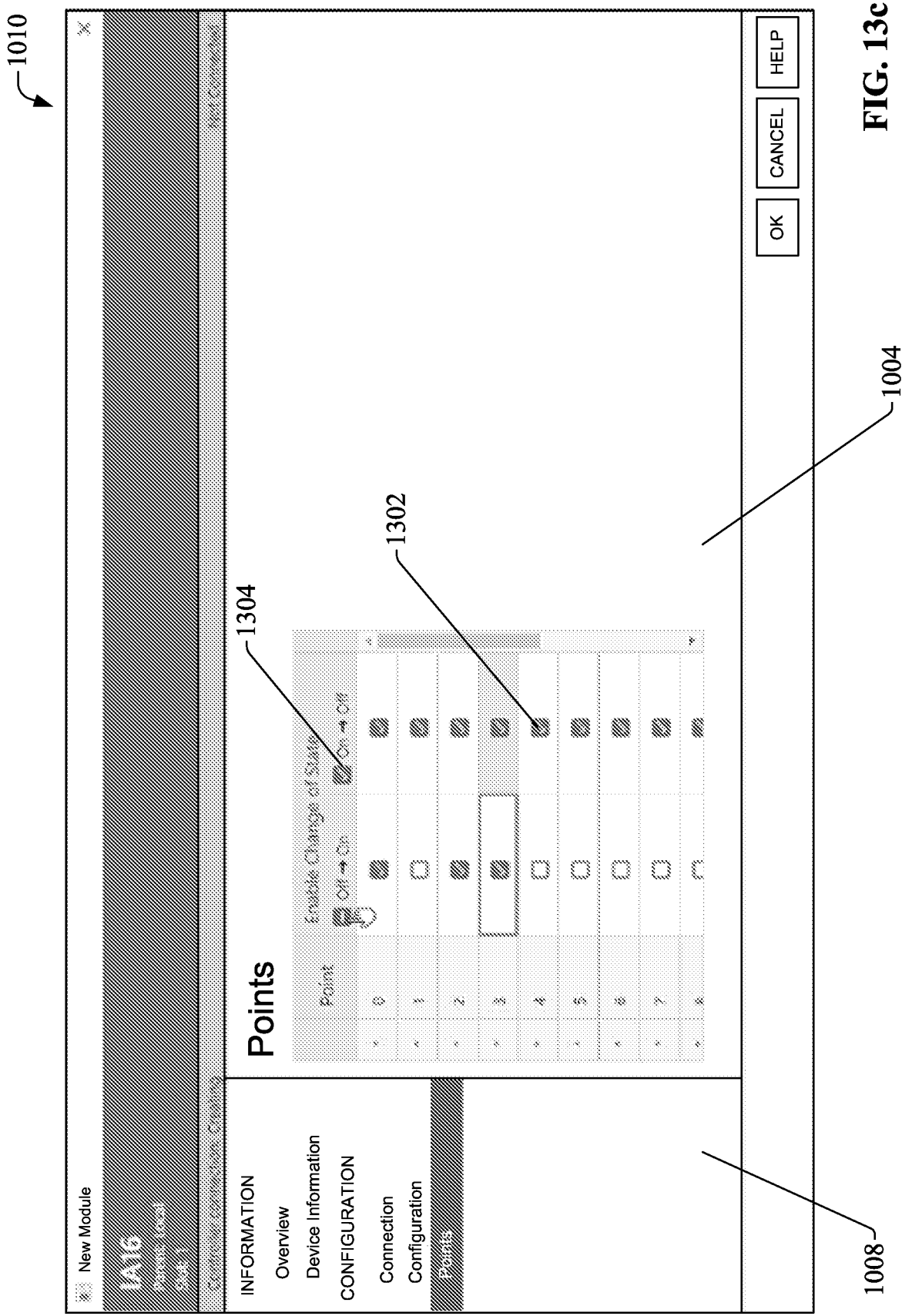
FIG. 13c is a view of the main workspace area of a device profile interface in which the Points category has been selected in the Category window.

FIG. 13*b* is a view of the main workspace area 1010 in which the Configuration category has been selected in the Category window 1008. For the selected analog input module, selecting this category causes the configuration area 1004 to display an interactive table that allows the user to set input filter times for groups of input points. FIG. 13*c* is a view of the main workspace area 1010 in which the Points category has been selected in the Category window 1008. This invokes another interactive table in the configuration area 1004 that allows the user to selectively enable or disable changes of state—both on-to-off and off-to-on transitions—for each input point of the module. In contrast to generic table-based interfaces, this graphical configuration interface comprises both individual checkbox controls 1302 that allow the user to enable or disable state changes for individual input points, as well as global checkbox controls 1304 that allow the user to enable or disable state changes for all of the module's input points with a single selection input.

Figure 14A:
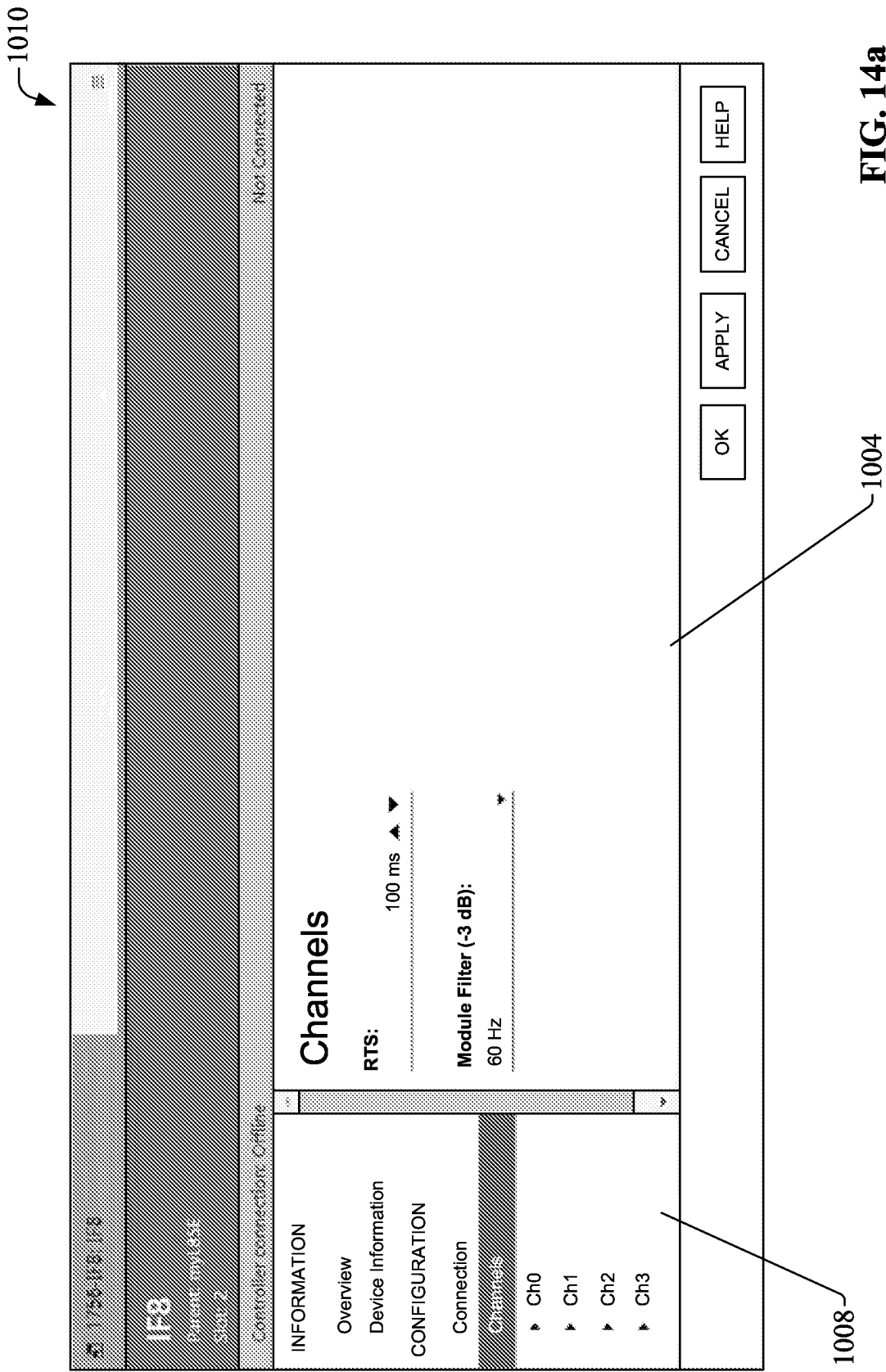
FIG. 14a is a view of the main workspace area of a device profile interface in which an 8-channel analog input module has been selected.
Figure 14B:
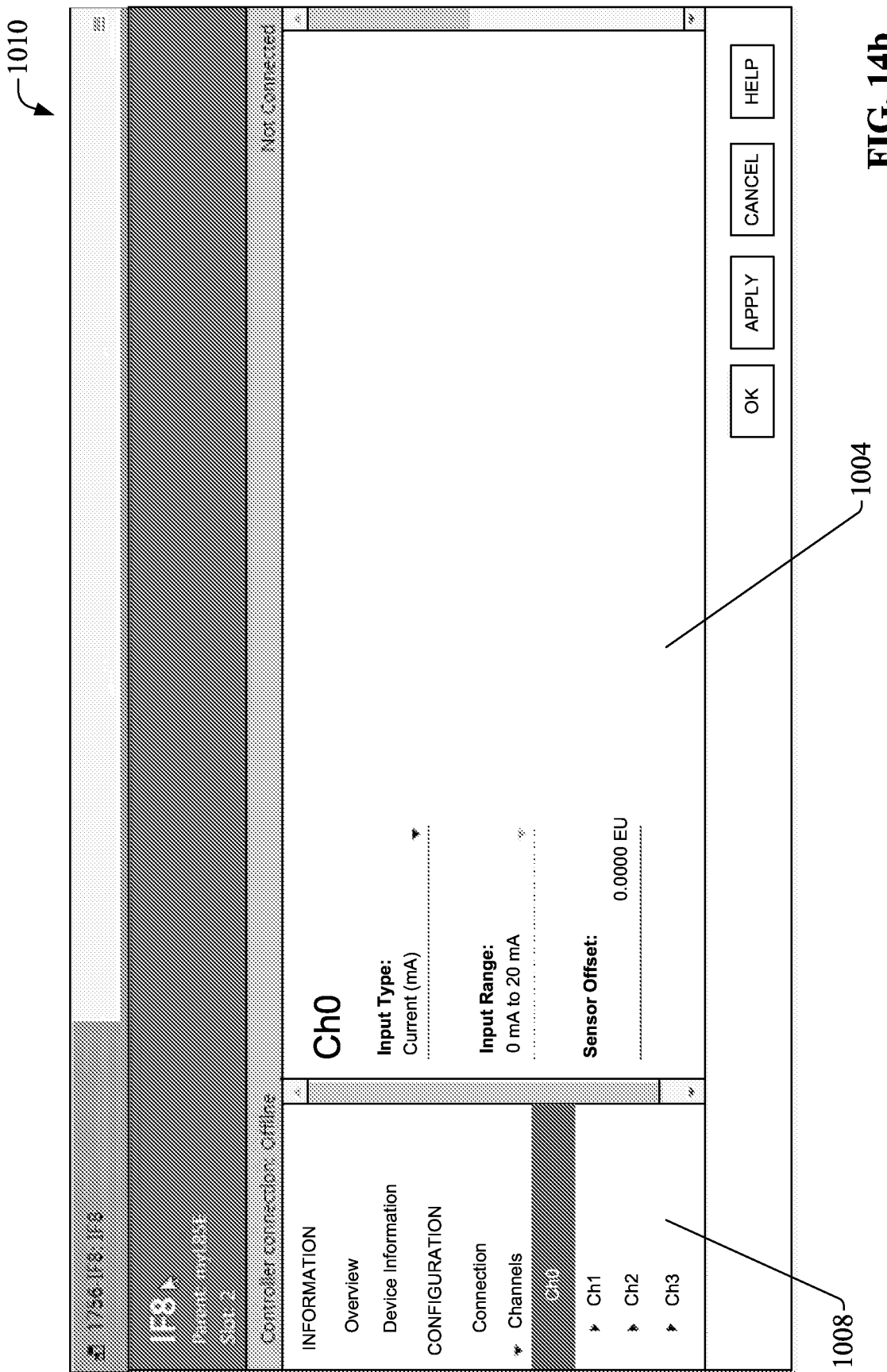
FIG. 14b is a view of the main workspace area of a device profile interface in which a user has selected to set configuration parameters for individual channels of an input module.
Figure 14C:
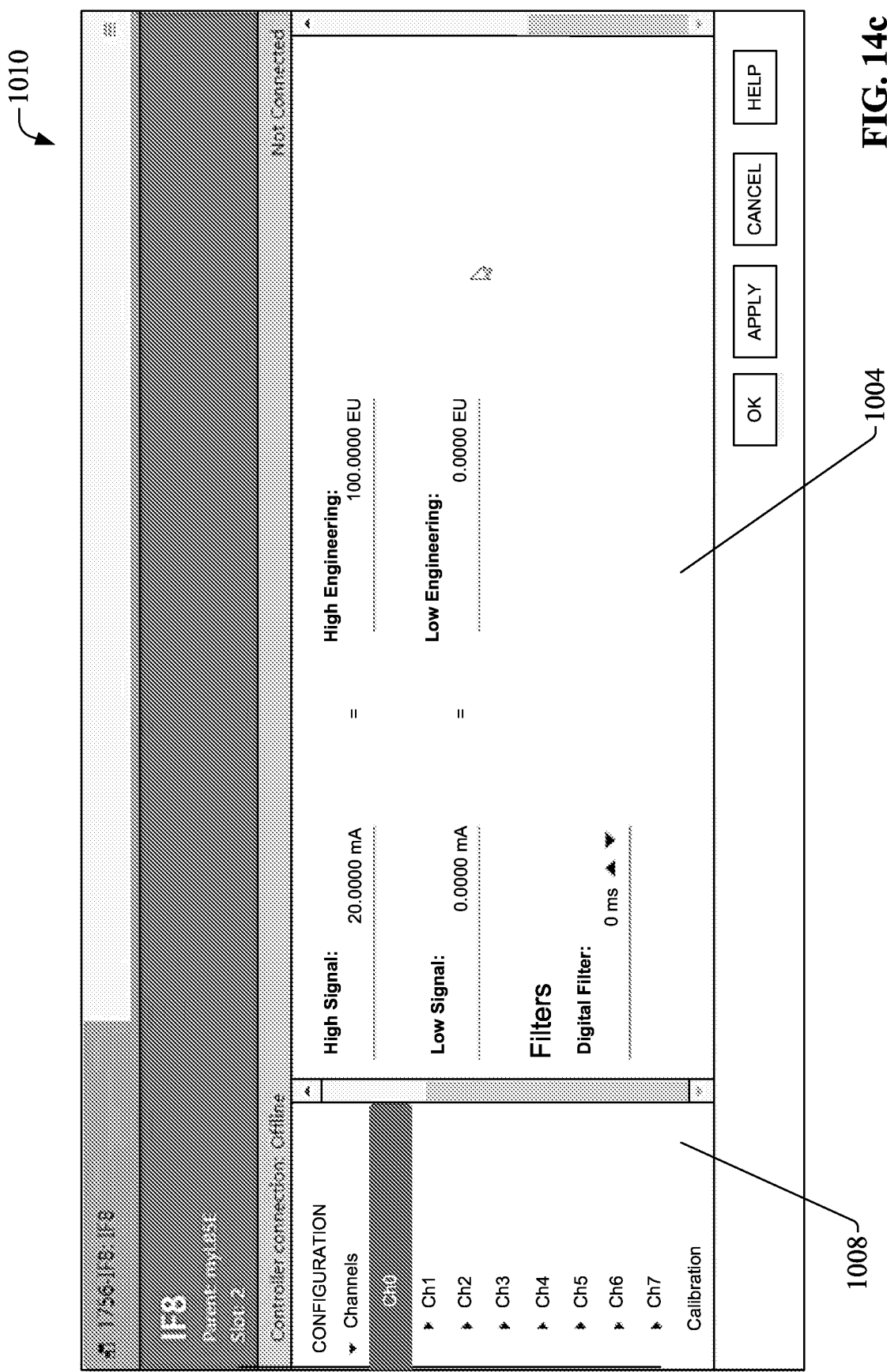
FIG. 14c is another view of the main workspace area of a device profile interface in which a user has selected to set configuration parameters for individual channels of an input module.

As noted above, the device profile 906 for the device being configured defines the configuration parameters that will be presented for viewing and editing in the main workspace area. FIG. 14*a* is a view of the main workspace area 1010 in which another type of device—an 8-channel analog input module—has been selected. In this scenario, the configuration categories listed in the Category window 1008 include a Channels category for configuring the analog input channels of the module. General channel parameters that are applicable to all channels—including the real time sampling (RTS) period and the module filter frequency—are rendered in the configuration area 1004 and can be edited by the user. In addition, configuration parameters for each individual channel can be set within the configuration area 1004, as shown in FIGS. 14*b* and 14*c*. These channel-specific parameters can include, but are not limited to, a type of input signal provided to the channel (e.g., current or voltage), a range of the input signal (e.g., 4-20 milliamp, 0-10 volts, etc.), an offset value for the channel, high and low input signal limits, digital filter value, or other such configuration settings.

In some embodiments, the IDS system 202 can be configured to generate dynamic feedback in response to determining that the user has submitted a device configuration parameter value that is not within a valid range for the edited parameter. In this regard, some device profiles 906 can define ranges of valid values for respective device parameters. As the user submits device configuration parameter values, the project generation component 206 can verify that each parameter value submitted by the user is within the valid ranges. If the user enters a parameter value that is outside that parameter's valid range, the user interface component 204 can render a notification on the development interface 1002 indicating that the value entered by the user is invalid. The project generation component 206 can reject any submitted parameter values that are outside their valid ranges.

The device configuration interfaces illustrated in FIGS. 10-14*c* and described above provide an intuitive interface for configuring industrial devices used in the system project 302. The device profile library 902 can store device profiles 906 for devices offered by multiple different device vendors, and the IDE system's interface allows these devices to be configured using a common device configuration workflow regardless of device vendor. The graphical device configuration interfaces generated by the IDE system 202 offer a more intuitive configuration workflow relative to more generic table-based device configuration interfaces. In some embodiments, the IDE system 202 can generate the device configuration interfaces using a web-based format, such as hypertext markup language (HTML), allowing the interfaces to be executed on a cloud platform or internet server and served to any type of device that supports web browsing. This format also allows the resulting device configuration interfaces to support a greater degree of customization relative to simple text-based device configuration profiles.

Figure 15:
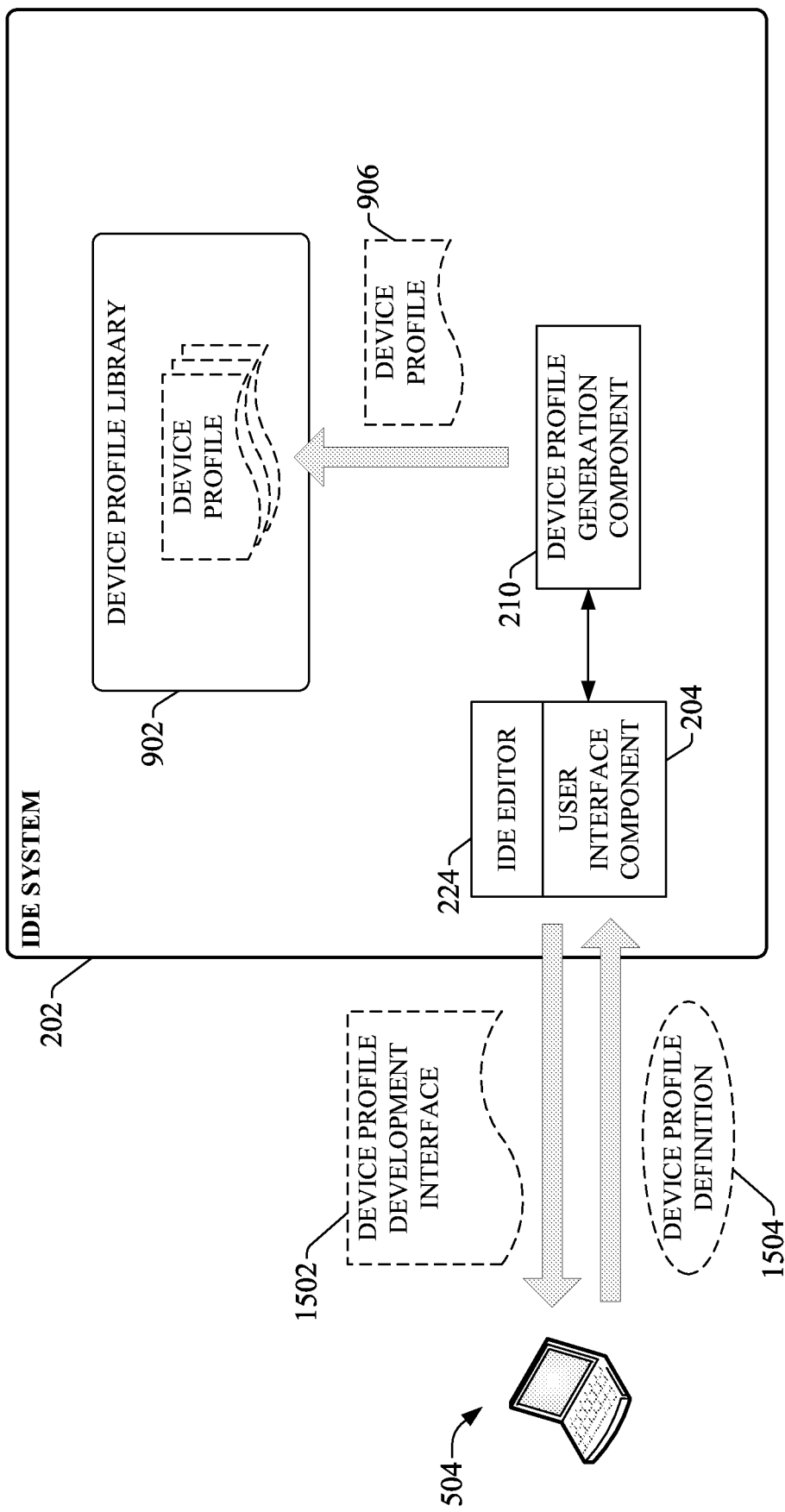
FIG. 15 is a diagram illustrating creation of device profiles for storage in a device profile library.

In some embodiments, the IDE system's capabilities can be extended to support creation of device profiles 906 using an intuitive graphical interface. FIG. 15 is a diagram illustrating creation of device profiles 906 for storage in the device profile library 902. In an example embodiment, the IDE system 202 can allow the user to launch a device profile development environment from the IDE system's main project development environment. The user interface component 204 can serve this profile development environment to a client device 504 as a device profile development interface 1502. As will be described in more detail below, the device profile development interface 1502 renders predefined templates for configuring the device profile configuration interfaces and views described above. The user can submit device profile definition data 1504 via interaction with these templates, and a device profile generation component 210 translates this device profile definition data 1504 into a device profile 906, which is stored in the device template library 902 for selective inclusion in system projects 302 (as illustrated in FIG. 9).

Figure 16:
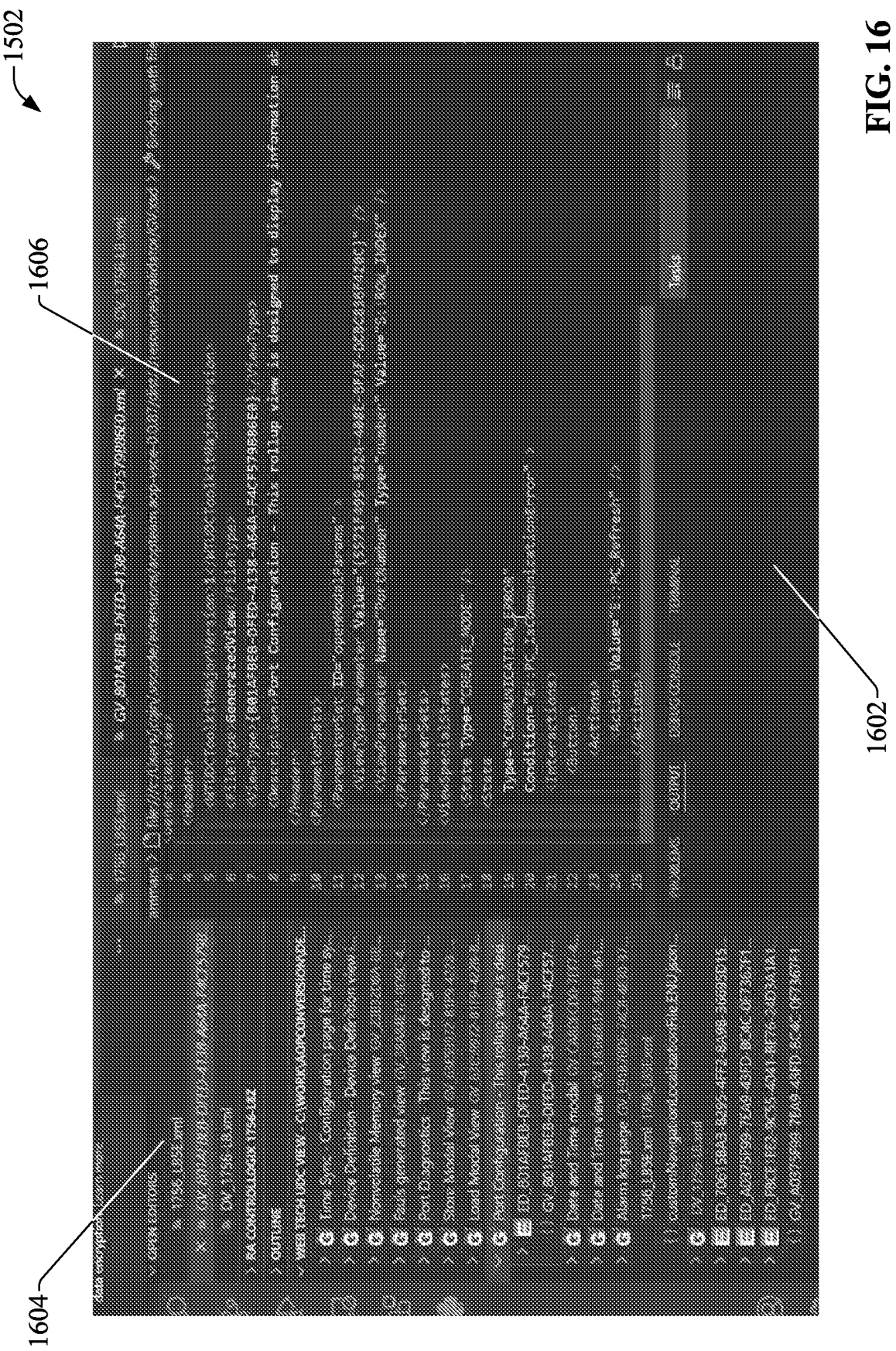
FIG. 16 is an example device profile development interface that can be generated by the user interface component of a device profile development environment.
Figure 17:
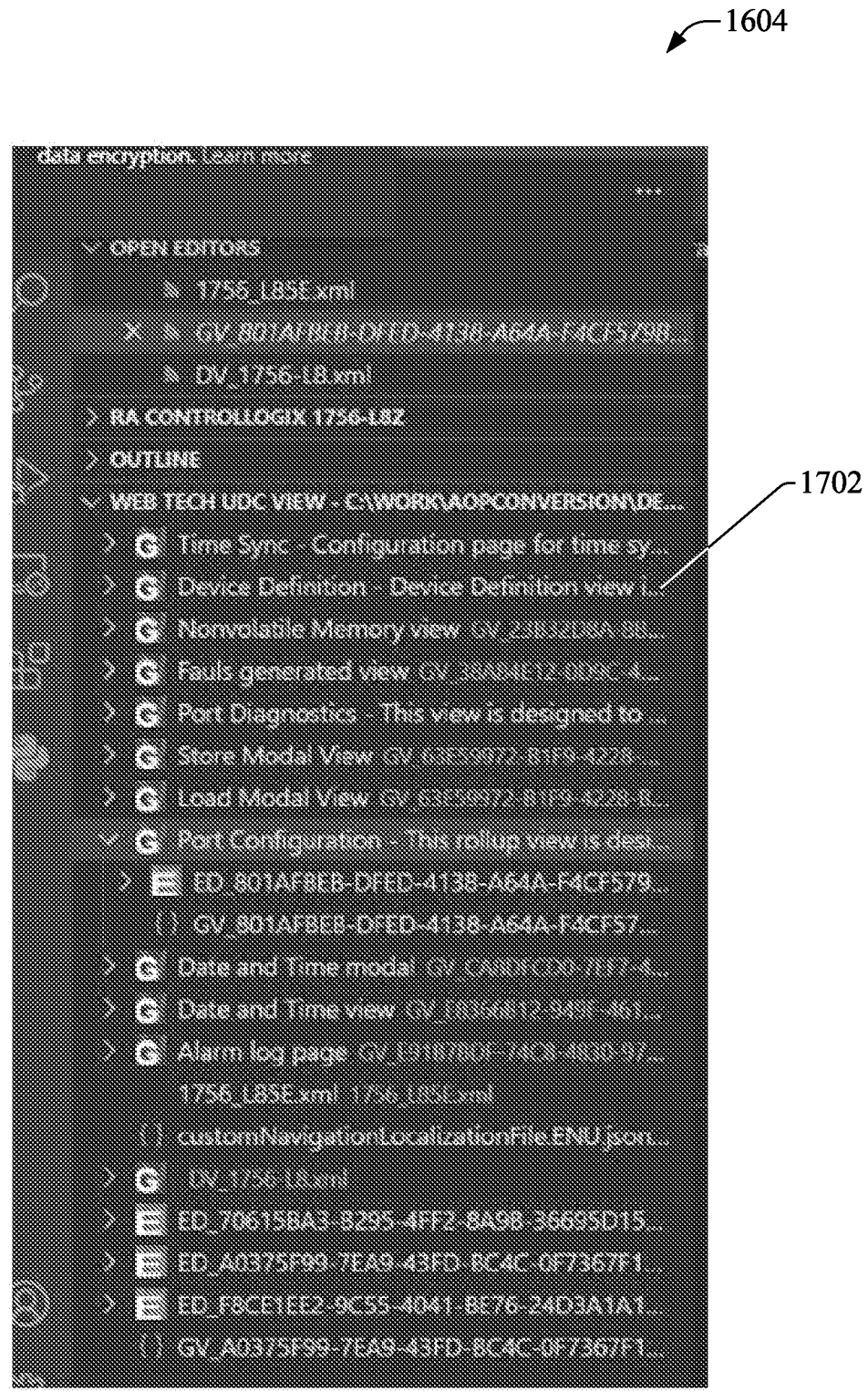
FIG. 17 is an isolated view of the explorer window for a device profile development interface.

FIG. 16 is an example device profile development interface 1502 that can be launched by the user interface component 204 according to one or more embodiments. In some embodiments, the profile configuration interface 1502 can be launched from the IDE system's main development interface 1002. Profile configuration interface 1502 can be divided into two main work areas—a main configuration area 1606 and an explorer window 1604. FIG. 17 is an isolated view of the explorer window 1604. The explorer window 1604 can display a list of device profile views 1702 for editing by the user. These views 1702 correspond to predefined device profile configuration displays, such as those illustrated in FIGS. 12-14c. Example views 1702 that can be selected and edited from the explorer window 1604 include, but are not limited to, a Device Definition view (illustrated FIG. 12), a Time Synchronization view for configuring time synchronization properties, a Nonvolatile Memory view, a Faults Generated view for configurating fault conditions, a Port Diagnostics view, a Port Configuration view for configuring the device's port communication settings, a Date and Time view, an Alarm Log view, a Channel Configuration view for setting calibration parameters for the device's data channels, an Input Point Configuration view (illustrated in FIG. 13b), a Channel Configuration view (illustrated in FIG. 14a), or other such device profile views.

Figure 18:
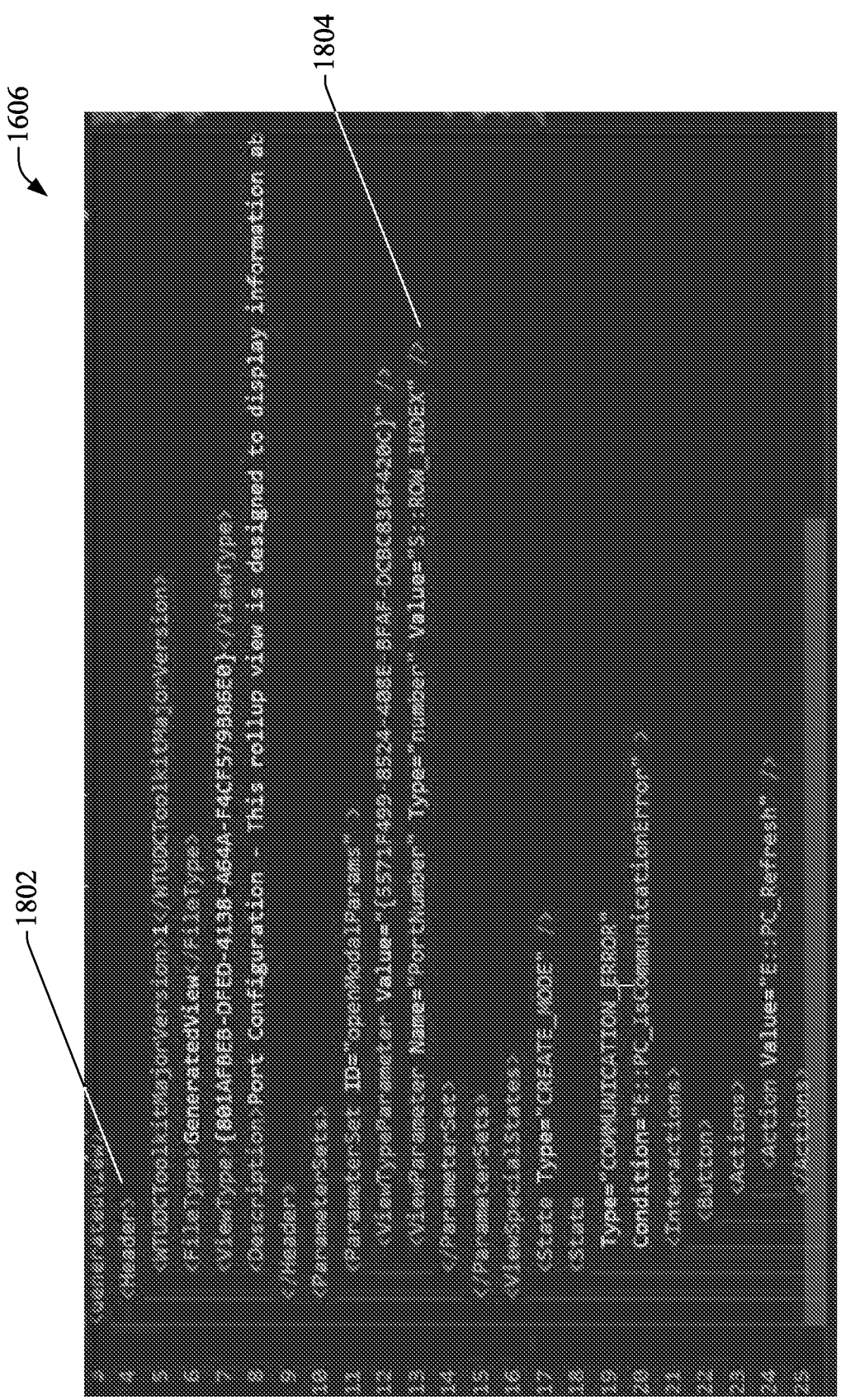
FIG. 18 is an isolated view of the configuration window when the Port Configuration view is selected in the explorer window of a device profile development interface.

Selection of a view 1702 from the explorer window 1604 causes the configuration area 1606 to display the underlying code that defines and configures the selected view. FIG. 18 is an isolated view of the configuration area 1606 when the Port Configuration view is selected in the explorer window 1604. In the examples illustrated herein, the device profile views are written in extensible markup language (XML) code. However, some embodiments can support the use of other suitable scripting languages for defining and editing device profile views. As shown in FIG. 18, visual and interactive features of the selected device profile view are defined using XML code. These features can include, but are not limited to, text to be displayed on the view; interactive graphical controls such as buttons, data entry fields, drop down selection windows, checkboxes, or other such controls; device parameters that can be viewed and edited on the selected view; or other such profile view features. The code can also define formatting for any of the defined view features.

Features of the selected profile view are delineated or labeled within the code using tags 1802 (e.g., XML tags). The content of the code is a function of the view 1702 that was selected in the explorer window 1604. For example, the code for the Port Configuration view illustrated in FIG. 18 includes a line 1804 for a port number parameter, which defines the name of the parameter ("PortNumber") a type of the parameter ("number"), and a value register for the port number parameter. This device parameter is defined with a section of code (labeled ParameterSets) designated for defining parameters associated with the selected view. Another section of the code (labeled ViewSpecialStates) is designated for defining device states associated with the port configuration view (e.g., communication errors).

The user can customize the selected device profile view by modifying any portion of the code within the configuration area 1606. When a device profile view 1702 is selected in the explorer window 1604, the formatted code for the selected view rendered in the configuration area 1606 serves as a predefined template for the selected device profile view. The tags 1802 within the code can assist the user in identifying code elements corresponding to different visual or functional features of the selected device profile view. These code elements can then be edited as needed to customize the selected feature. Such modifications can include, for example, adding or removing device parameters; adding, removing, changing, or moving text displayed on the device profile view; changing a permissible range of values for a selected parameter; changing a register location for a selected parameter; adding or removing graphical controls (e.g., buttons, drop-down selection boxes, data entry windows, checkboxes, etc.); changing a file location of a device image file for the device; or other such device profile modifications.

Figure 19:
FIG. 19 is a view of a device profile development interface in which an explorer window has been divided into a first section that lists files associated with the currently selected view and a second section that lists the selectable device profile views.

In some embodiments, the explorer window 1604 can be divided into multiple sections to assist a user in locating a desired profile view 1702 or file associated with the device profile. FIG. 19 is a view of the device profile development interface 1502 in which the explorer window 1604 has been divided into a first section 1604a that lists files 1902 associated with the currently selected view and a second section 1604b that lists the selectable device profile views 1702. In this example embodiment, selecting a profile view from the second section 1604b causes the code for the selected view to be displayed in the configuration area 1606, as discussed above. Additionally, the first section 1604a of the explorer window lists the files 1902 associated with the selected profile view. These files 1902 can include the file containing code for the selected view 1702 (e.g., an XML file), a file defining default values for the device parameters associated with the selected view 1702 (e.g., a JavaScript object notation, or JSON, file), or other such files. Selection of a file 1902 from the first section 1604a causes the content of the selected file 1902 to be displayed in the configuration area 1606.

Figure 20:
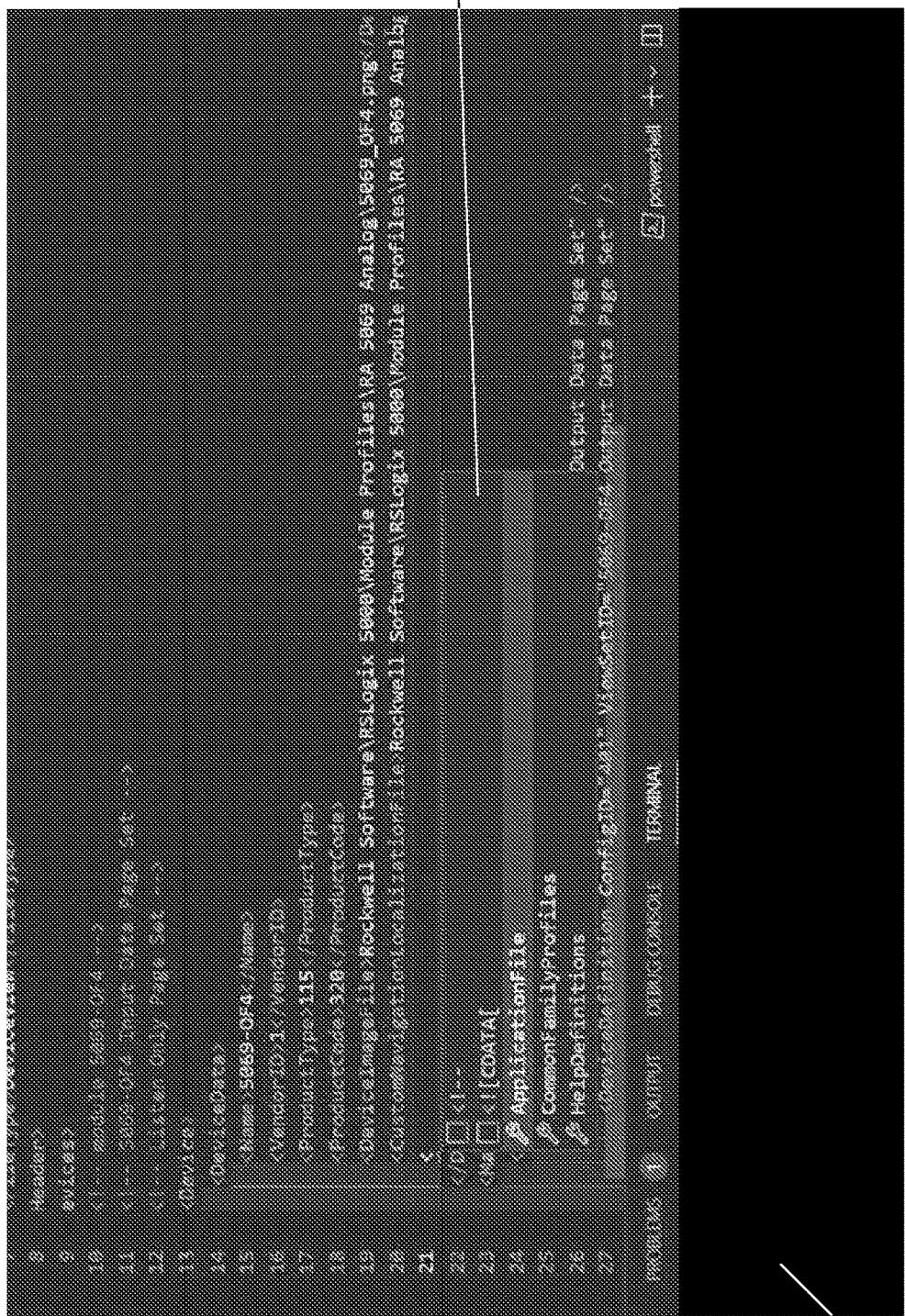
FIG. 20 is a view of the configuration area of a device profile development interface in which a feedback window offering development feedback is displayed as an overlay.

The development interface 1502 can also support dynamic validation of the user's profile view edits, and can generate feedback designed to guide the user through the process of editing a profile view. FIG. 20 is a view of the configuration area 1606 in which a feedback window 2002 offering development feedback is displayed as an overlay. As the user submits modifications to the profile view code, the user interface component 204 can provide guidance or tips in the form of auto-completions, recommendations, graphical flags indicating improper entries (e.g., entries that are outside a valid range for an element being edited), text messages offering recommendations or indicating problems with the edits, or other such feedback. In the example depicted in FIG. 20, based on the current location of the curser within the code, the configuration area 1606 has rendered a feedback window 2002 listing possible elements that may suitably be entered at the current cursor location. These recommended elements can include, for example, a tag name, an object name or type, a template for a function that may appropriately be inserted at the cursor location, a file name, a device image file, or other such elements. In general, the feedback window 2002 lists a filtered or expected set of elements that could be appropriately entered at the cursor location based on an analysis of the code context relative to the cursor location. If desired, the user can select an element from the feedback window 2002, which causes the selected element to be inserted at the cursor location.

The development interface 1502 can also support other types of dynamic validation and feedback during the profile editing process, including but not limited to auto-completion of text being entered into the code by the user, graphically indicating invalid elements within the code, or other such feedback. In general, the development interface 1502 can use predefined development guardrails to ensure that modified elements conform to valid formats, data types, value ranges, or syntax for those elements. These predefined guardrails can define, for respective different types of view or profile elements, valid data types, value ranges, formatting, syntax, or other such element properties. In response to determining that the user has modified a code element in a manner that violates the defined guardrails for the element type, the development interface 1502 can render a graphical indicator that identifies the element, as well as a text message that explains the how to correct the invalid modification.

Figure 21:
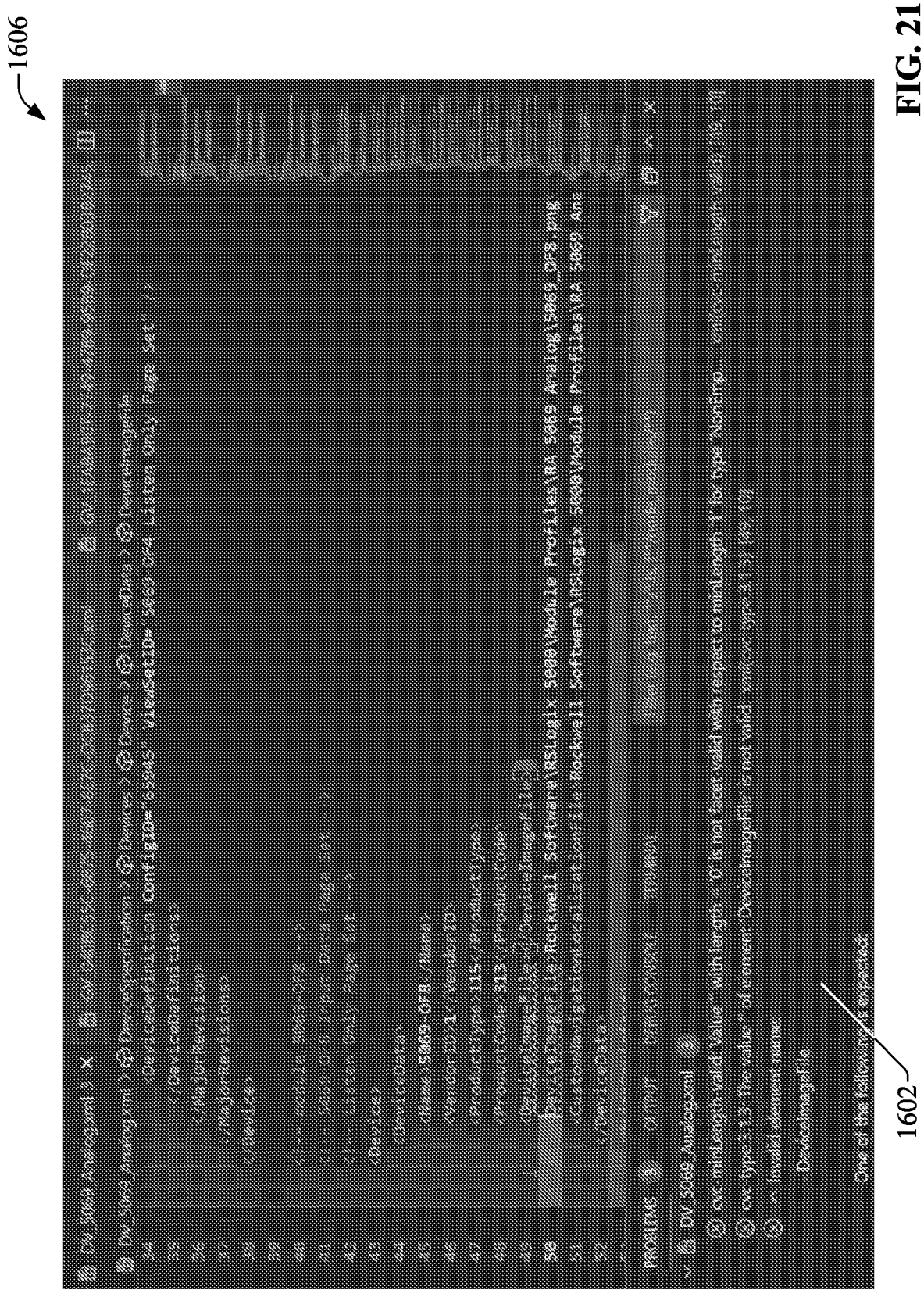
FIG. 21 is a view of the configuration area of a device profile development interface in which various error messages are displayed within the debugging window.

Some embodiments of the development interface 1502 can include a debugging window 1602 pinned to an edge of the interface 1502. In the example depicted in FIG. 20, the debugging window 1602 is pinned to a bottom edge of the interface 1502. This debugging window 1602 can display messages describing validation errors within the device profile code, guiding users to problems within the code and suggesting corrections. FIG. 21 is a view of the configuration area 1606 in which various error messages are displayed within the debugging window 1602. In this example, the device profile generation component 210 has identified three problems within the code currently being viewed. Accordingly, three error messages describing these problems are displayed in the debugging window 1602. These messages can indicate such problems as invalid values assigned to elements of the code (corresponding to features of the corresponding device profile view), invalid element names, invalid data lengths, or other such issues. For some error messages, the debugging window 1602 can also display a recommended correction or guideline for correcting the error (e.g., displaying the range of valid values for an element, indicating the valid data format for an invalid entry, etc.).

In some embodiments, the configuration area 1606 can also generate graphical indicators within the code that indicate the invalid elements corresponding to each error message. Also, selection of an error message in the debugging window 1602 can cause the configuration area 1606 to navigate to the portion of code or code element corresponding to the selected error message, thus assisting the user in locating and correcting invalid code.

Figure 22:
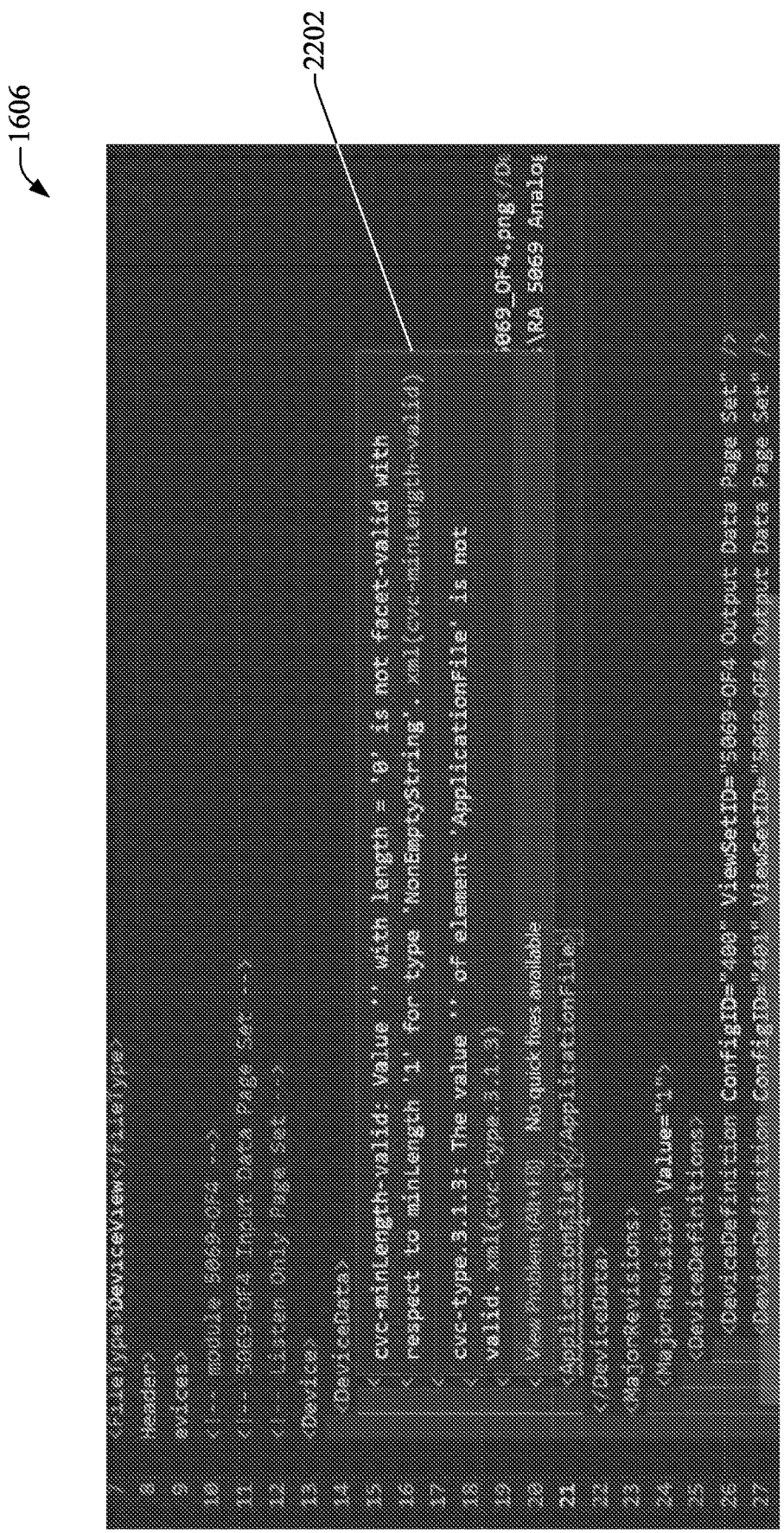
FIG. 22 is a view of the configuration area of a device profile development interface in which an error window is rendered as an overlay.

In addition to, or as an alternative to, the debugging window 1602, the configuration area 1606 may display an error window 2202 as an overlay within the coding area. FIG. 22 is a view of the configuration area 1606 in which an error window 2202 is rendered as an overlay. In some embodiments, this error window 2202 can be invoked by hovering the cursor over, or right-clicking on, a code element or portion flags as being invalid. The error window 2202 can display error information similar to that displayed by the debugging window 1602.

Figure 23:
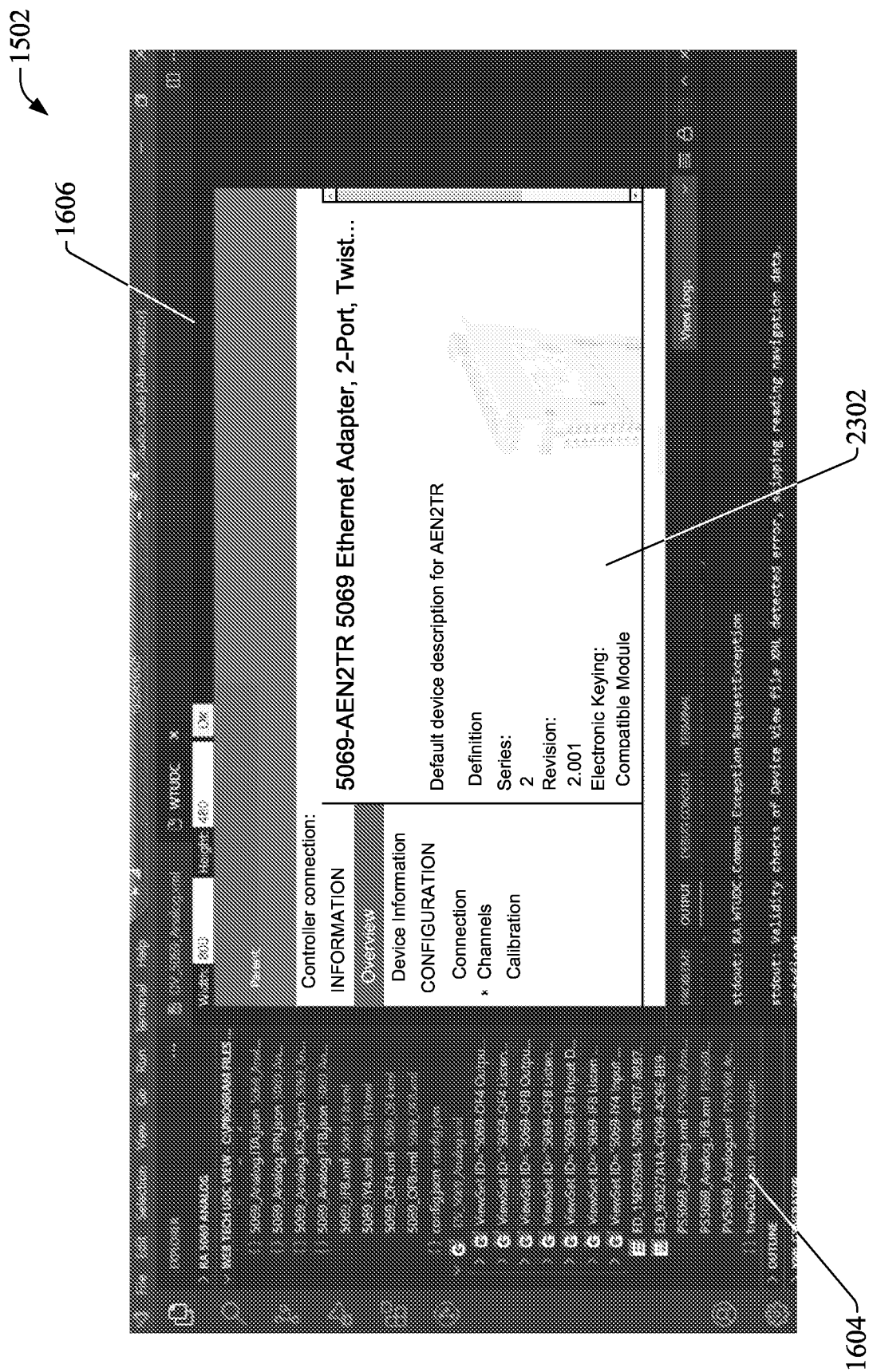
FIG. 23 is a view of a device profile development interface in which a graphical view of the current device profile has been launched.

To facilitate testing and debugging of the device profile within the profile development environment, some embodiments of the device profile development interface 1502 can allow the user to launch a graphical view of the device profile currently being edited. FIG. 23 is a view of the profile development interface 1502 in which a graphical view 2302 of the current device profile has been launched. In some embodiments, the graphical view 2302 can be launched by selecting a control (not shown) on the configuration area 1606 or explorer window 1604. When the graphical view is invoked, the device profile generation component 210 translates the code for the device profile currently being edited into its corresponding graphical view 2302, and the user interface component 204 renders this graphical view 2302 on the profile development interface 1502 to allow the user to visually verify the content and operation of the profile view. The graphical view 2302 is the device profile interface that will be presented by the IDE system 202 when the device profile is invoked within the IDE system's development environment for configuration of device profiles.

The graphical view 2302 reproduces the device profile views that will be invoked within the IDE system's main development interface 1002 (such as the views illustrated in FIGS. 10-14*c*). The user can interact with any controls included on the view 2302 to verify correct operation of the device profile configuration windows. In this way, the graphical view 2302 allows the user to verify the correct placement and formatting of text displayed on the view 2302, to verify that the expected device parameters are presented on the view 2302 for editing by the end user, to verify that requisite graphical controls (e.g., buttons, data entry fields, drop-down windows, checkboxes, etc.) are present and operate correctly, to verify that the category window 1008 lists the correct configuration categories for the device, or to verify other visual or functional features of the view 2302. If a problem is found on the graphical view 2302, the user can return to the underlying code for the view 2302 and correct the issue via code modification. The graphical view 2302 can then be relaunched to confirm that the code modification has corrected the issue.

Figure 24:
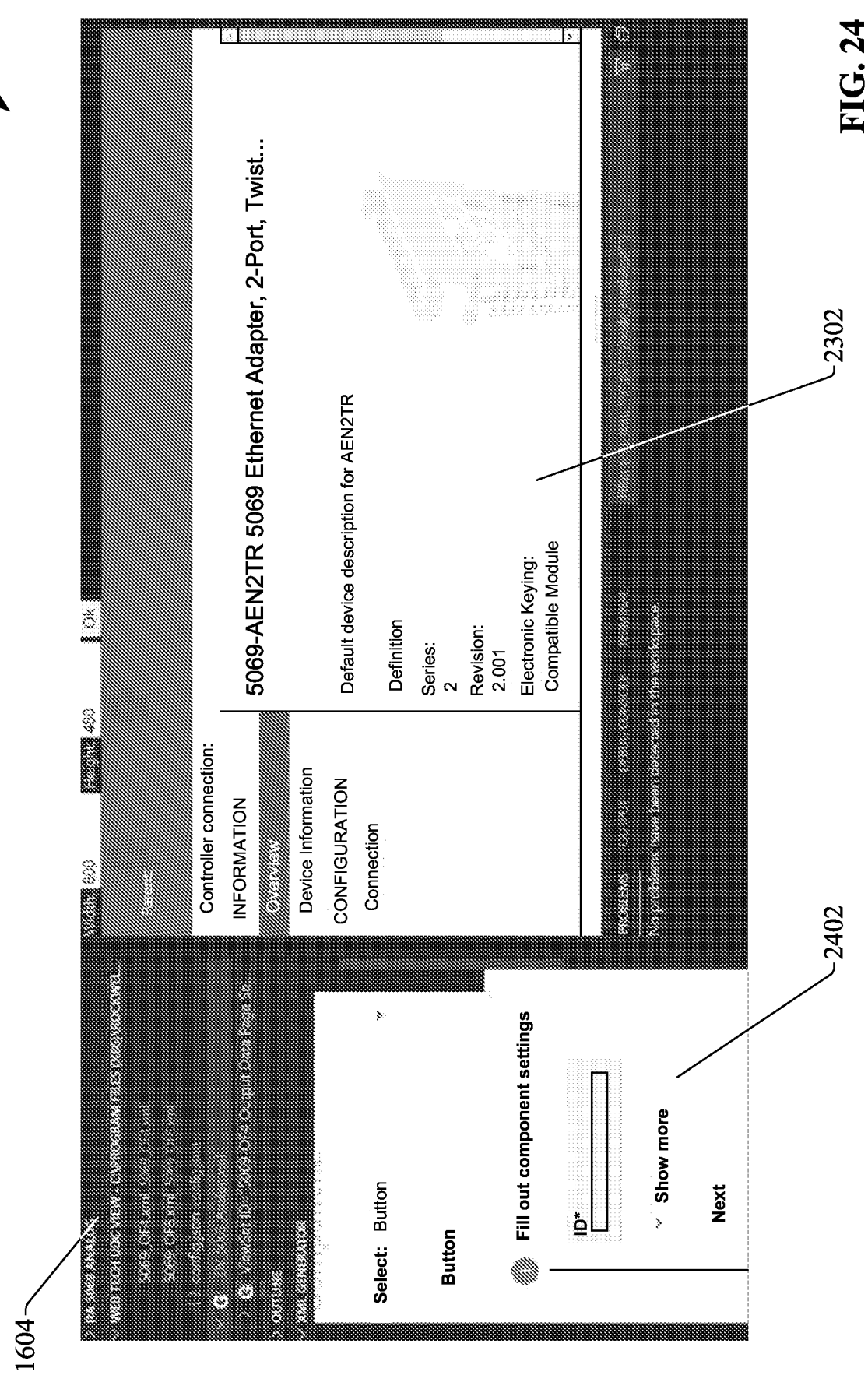
FIG. 24 is a view of a device profile development interface in which a graphical editing window has been invoked.

In some embodiments, the profile development interface 1502 can also allow the user to submit graphical edits directly to the graphical view 2302 of the device profile. FIG. 24 is a view of the device profile development interface 1502 in which a graphical editing window 2402 has been invoked. The graphical editing window 2402 can be used to define and submit graphical edits to the graphical view 2302 of the device profile within the profile development environment. Graphical editing window 2402 can support any suitable editing tools for submitting graphical edits directly to the graphical view 2302 of the device profile. For example, the editing window 2402 can render a set of graphical components—e.g., buttons, text blocks, check boxes, navigation links, drop-down selection boxes, etc.— which can be selectively added to the graphical view 2302 (e.g., by dragging-and-dropping the selected component to the graphical view 2302 or by double-clicking the selected component). Once a selected component has been added to the graphical view 2302, the profile development interface 1502 can allow the user to manipulate the location of the component on the graphical view 2302. Configuration windows can also be invoked on the development interface 1502 which allow the user to enter configuration settings or properties for the component. These settings or properties can include, for example, defined actions to be performed when a button is pressed, formatting for an item of text, definition of a device parameter or configuration register to be linked to a control component (e.g., a data entry window, checkbox, or drop-down selection box), or other such settings.

Figure 25:
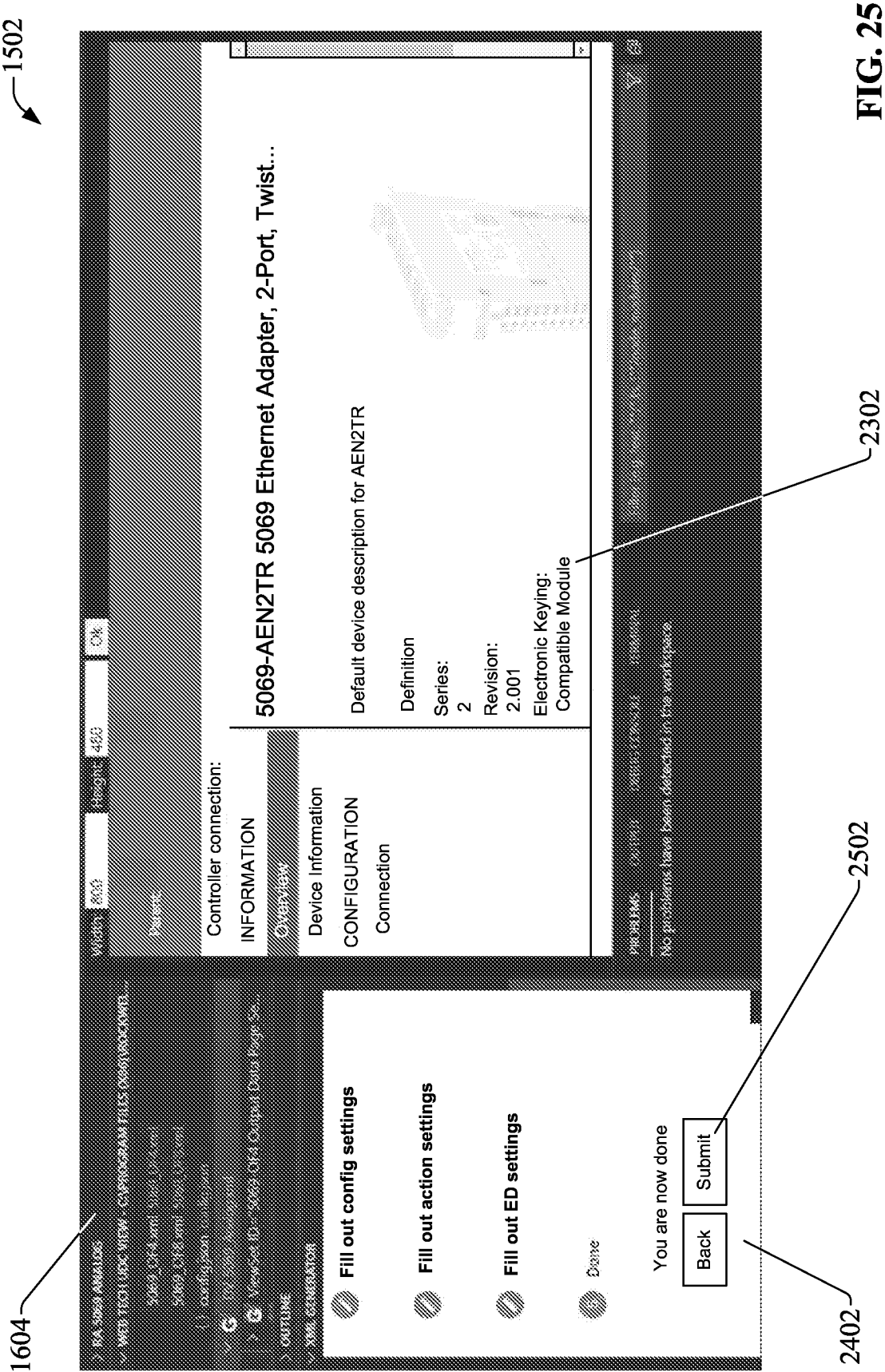
FIG. 25 is a view of a device profile development interface in which remaining steps of a graphical editing workflow are displayed on a graphical editing window.

According to another graphical editing workflow, the component settings can be set within the graphical editing window 2402 itself. In some such embodiments, the graphical editing window 2402 can render a guided workflow for submitting graphical edits to the graphical view 2302. As a first step of this workflow, the user can select a component type (e.g., a button) from a list of available components rendered on the editing window 2402 and enter component settings for the selected component within the window 2402, as shown in FIG. 24. FIG. 25 is a view of the device profile development interface 1502 in which the remaining steps of the graphical editing workflow are displayed on the graphical editing window 2402. These steps, which are listed sequentially, include entering configuration settings for the selected graphical component, entering action settings for the component, and entering ED settings for the device. Upon completion of these steps, the user can submit the configured graphical component by selecting a Submit button 2502 on the graphical editing window 2402, which places the component on the graphical view 2302. Other techniques for submitting graphical edits via interaction with the graphical view 2302 and associated editing windows are within the scope of one or more embodiments.

Any graphical edits made to the graphical view 2302 cause the underlying code defining the view 2302 to be updated to reflect the graphical edits. Thus, the development interface 1502 allows the user to develop a device profile configuration using both graphical editing and coding techniques interchangeably.

Once the user has completed development of the device profile 906 using the techniques described above, the user can opt to register the resulting device profile 906 in the device profile library 902 of the IDE system 202, as illustrated in FIG. 15. This makes the device profile 906 available for selective inclusion in system projects 302, as shown in FIG. 9. Once the device profile 906 has been added to a system project 302, the user can invoke the device configuration views that were developed for the profile 906 using the device profile development interface 1502. These device configuration views can be used to view and edit configuration parameters for the device represented by the device profile 906, and these configuration parameter values are stored as part of the system project 302.

Although the device profile development environment described above in connection with FIGS. 15-25 is depicted as being an integrated sub-system of the IDE system 202 itself, such that the device profile development interfaces can invoked within the control project development environment, in some embodiments the device profile development environment can be a separate, dedicated development environment for creating and editing device configuration profiles 906. In such embodiments, the resulting device profiles 906 can be exported to an industrial IDE system or other control project development systems for registration in a device profile library, where the profiles 906 can be selectively added to system projects 302 as needed.

The device profile development environment described herein allows an IDE-type interface to be used to create industrial device configuration profiles using both code-based and graphical development workflows, which can reduce development time for creating graphical device profiles. This profile creation approach can also increase profile reusability and encourage standardization of profiles by allowing the user to begin with predefined profile templates or existing profiles when creating a new device profile. By allowing a device profile to be previewed and tested graphically, the profile development environment eliminates the need to install, execute, and test a new device profile in the control development environment.

Figure 26A:
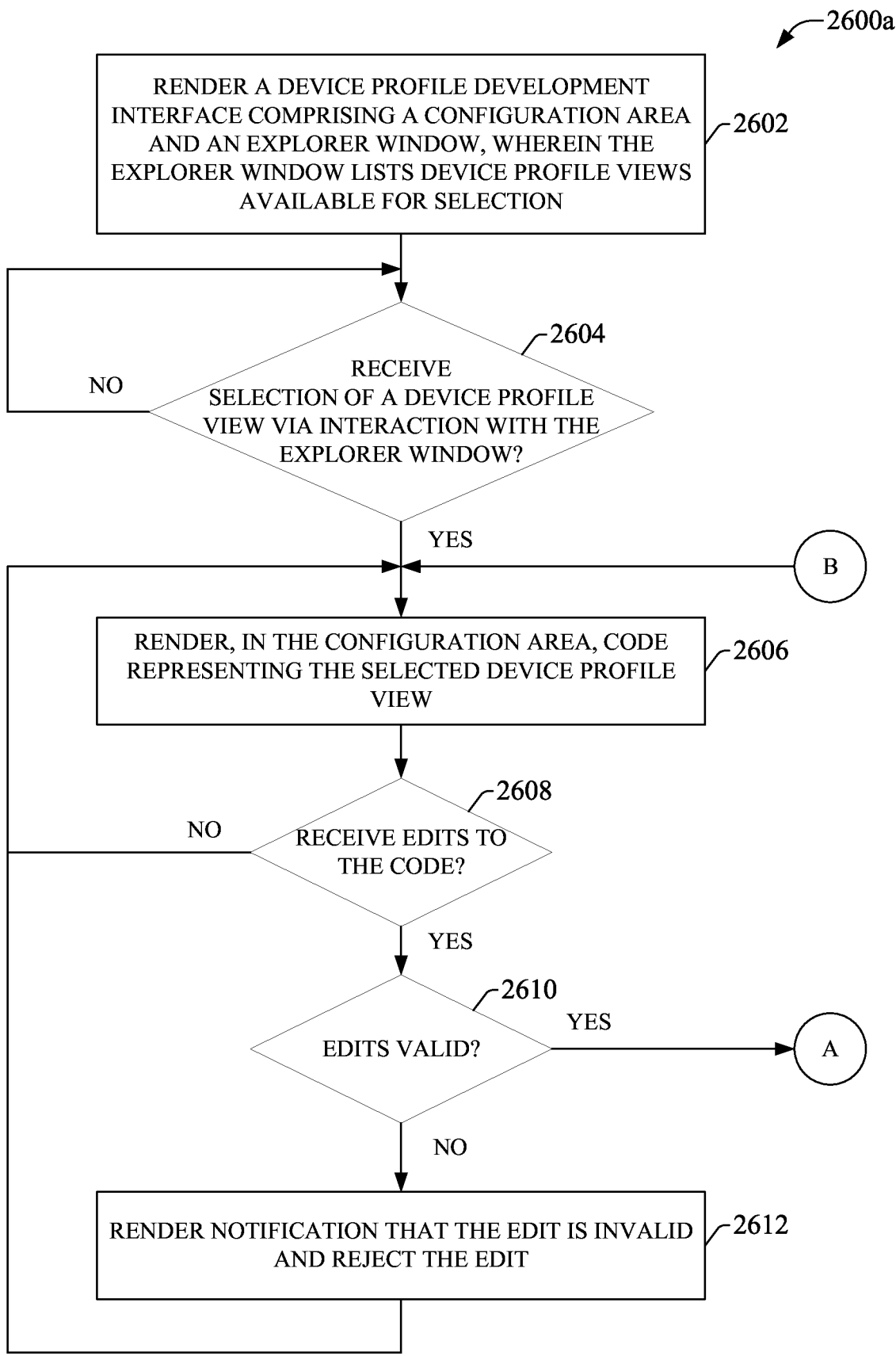
FIG. 26*a* is a flowchart of a first part of an example methodology for developing a device configuration profile within a device profile development environment.
Figure 26B:
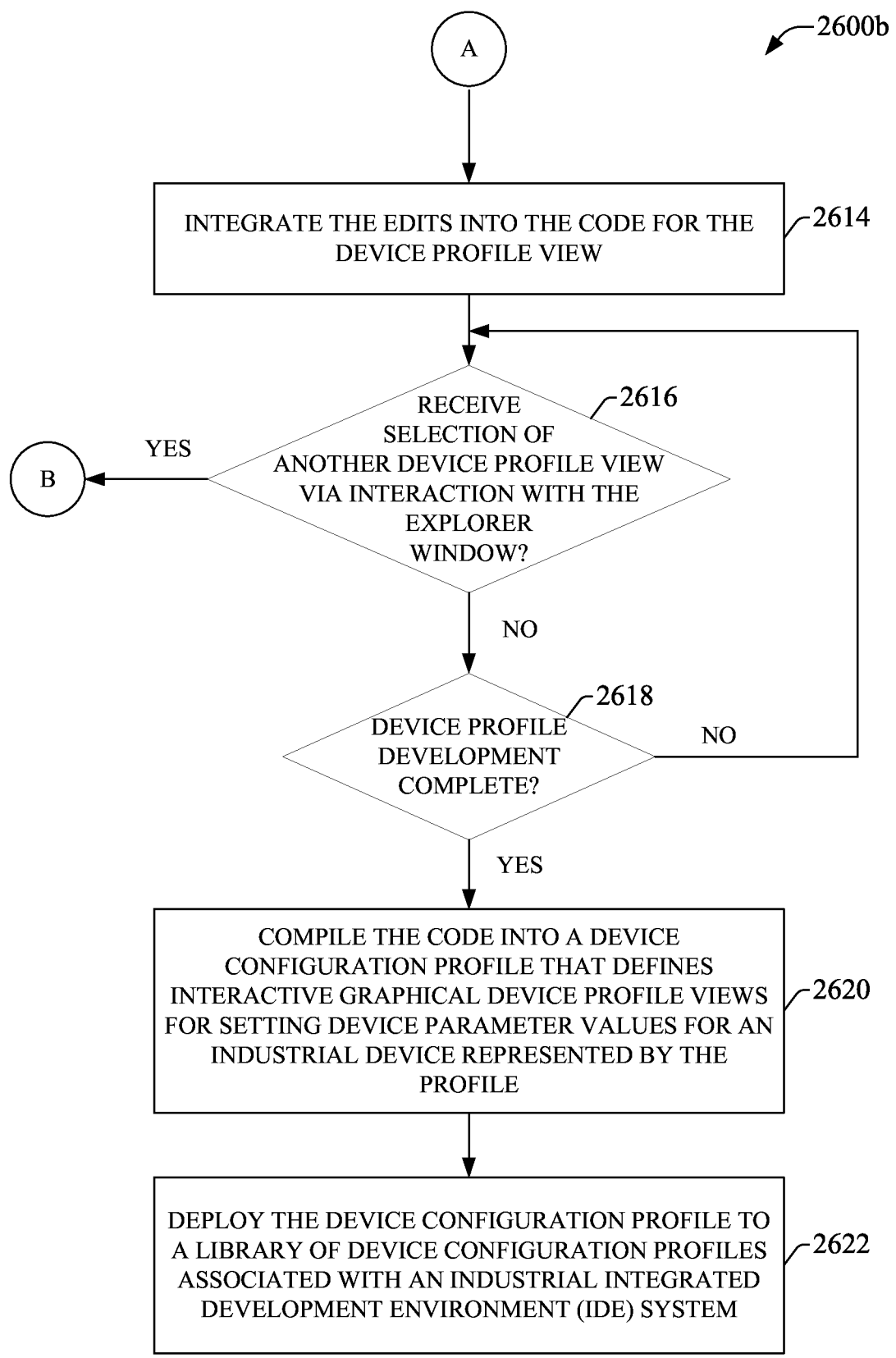
FIG. 26*b* is a flowchart of a second part of the example methodology for developing a device configuration profile within a device profile development environment.

FIGS. 26a-26b illustrate a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 26a illustrates a first part of an example methodology 2600a for developing a device configuration profile within a device profile development environment. Initially, at 2602, a device profile development interface is rendered on a client device. In some embodiments, the device profile development interface can be invoked on, and rendered by, an industrial IDE system used to develop industrial control projects (e.g., industrial control programming and device configurations), where the industrial IDE system supports the use of device profiles to configure device parameters for industrial devices (e.g., industrial control modules, variable frequency drives, telemetry devices, networking devices, etc.). In other embodiments, the device profile development interface can be generated by a dedicated device profile configuration system that is separate from the industrial IDE system. The device profile development interface can comprise a configuration area and an explorer window, where the explorer window lists device profile views that are available for selection.

At 2604, a determination is made as to whether selection of a device profile view is received via interaction with the list of available device profile views in the explorer window. The device profile views represent respective graphical interfaces that can be associated with a device profile, and which can be used to view and edit information and device parameter settings for an industrial device represented by the profile. Each device profile view can correspond to a different category of device information or configuration settings (e.g., general device information, alarm configurations, channel calibrations, memory view, communication port diagnostics, etc.).

If a selection of a device profile view is received (YES at step 2604), the methodology proceeds to step 2606, where code representing the selected device profile view is rendered in the configuration area of the device profile development interface. This code can comprise any type of executable code that can be translated into an interactive graphical display or window representing the selected device profile view, including but not limited to XML code. The content and formatting of the code is a function of the selected device profile view such that the code is translatable to the selected view.

At 2608, a determination is made as to whether edits to the code are received via interaction with the explorer window. In this regard, a user may edit the code to implement changes to the corresponding device profile view. These edits can comprise, for example, addition, removal, or modification of text displays; addition, removal, or modification of device parameters to be made available for viewing and editing on the device profile view; changing write privileges for selected device parameters; adding, removing, or modifying graphical control elements (e.g., buttons, checkboxes, drop-down selection boxes, data entry boxes, etc.); or other such edits.

In some embodiments, the device profile development interface can also support graphical editing of the device profile view in addition to code-based editing. In such embodiments, the user can launch a graphical view of the device profile being edited within the profile development interface. Launching the graphical view causes the interface to translate the device profile code to its corresponding graphical device profile interface and to present this view of the device profile for review and editing. The user can interact with this graphical view to submit graphical edits to the view. To facilitate these graphical edits, the profile development interface can also render a graphical editing window from which the user can select graphical controls or objects to be added to the graphical view of the profile (e.g., by dragging-and-dropping the controls or objects to the graphical view). Graphical changes to the graphical view submitted in this manner are automatically reflected in the underlying code for the corresponding device profile view.

If it is determined that edits to the code are received (YES at step 2608), the methodology proceeds to step 2610, where a determination is made as to whether the submitted edits are valid. The device profile development environment is capable of dynamically verifying the validity of edits made to elements within the device profile code, including but not limited to verifying correct code syntax, verifying that values entered for a given code element are within a valid range for the elements, validating that a value or parameter entered for a code element conforms to an expected data type for that element, or performing other such dynamic code validations. If the edits are not valid (NO at step 2610), the methodology proceeds to step 2612, where a notification is rendered indicating that the edit is valid, and the edit is rejected. The notification can also provide guidance for correcting the invalid edit; e.g., by informing the user of the valid data type or range for the modified code element. The methodology then returns to step 2606 to allow the user to re-submit the edits if desired, or to continue with other edits to the device profile view. Alternatively, if the edits are determined to be valid (YES at step 2610), the methodology proceeds to the second part 2600*b* illustrated in FIG. 26*b*.

At 2614, the edits submitted at step 2608 are integrated into the code for the device profile view currently being edited. At 2616, a determination is made as to whether selection of another device profile is received via interaction with the explorer window. In general, the device profile development interface allows the user to select and edit different device profile views to be included in the device profile currently being created. If another device profile view is selected (YES at step 2616), the methodology returns to step 2606, and steps 2606-2612 are repeated to allow the user to edit the selected device profile view. Alternatively, if no device profile view is selected (NO at step 2616), the methodology proceeds to step 2618, where a determination is made as to whether the user indicates that development of the current device profile is complete. If development of the device profile is complete (YES at step 2618), the methodology proceeds to step 2620, where the device profile code, as edited by the user, is complied into a device configuration profile that defines interactive graphical interfaces or views for setting device parameter values for an industrial device represented by the profile. At 2622, the device configuration profile is deployed to a library of device configuration profiles associated with an industrial IDE system. Once deployed to the library, the device configuration profile can be selected within an industrial control development platform for inclusion in an industrial control project and used to set values of device configuration parameters for the industrial device represented by the profile.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 27:
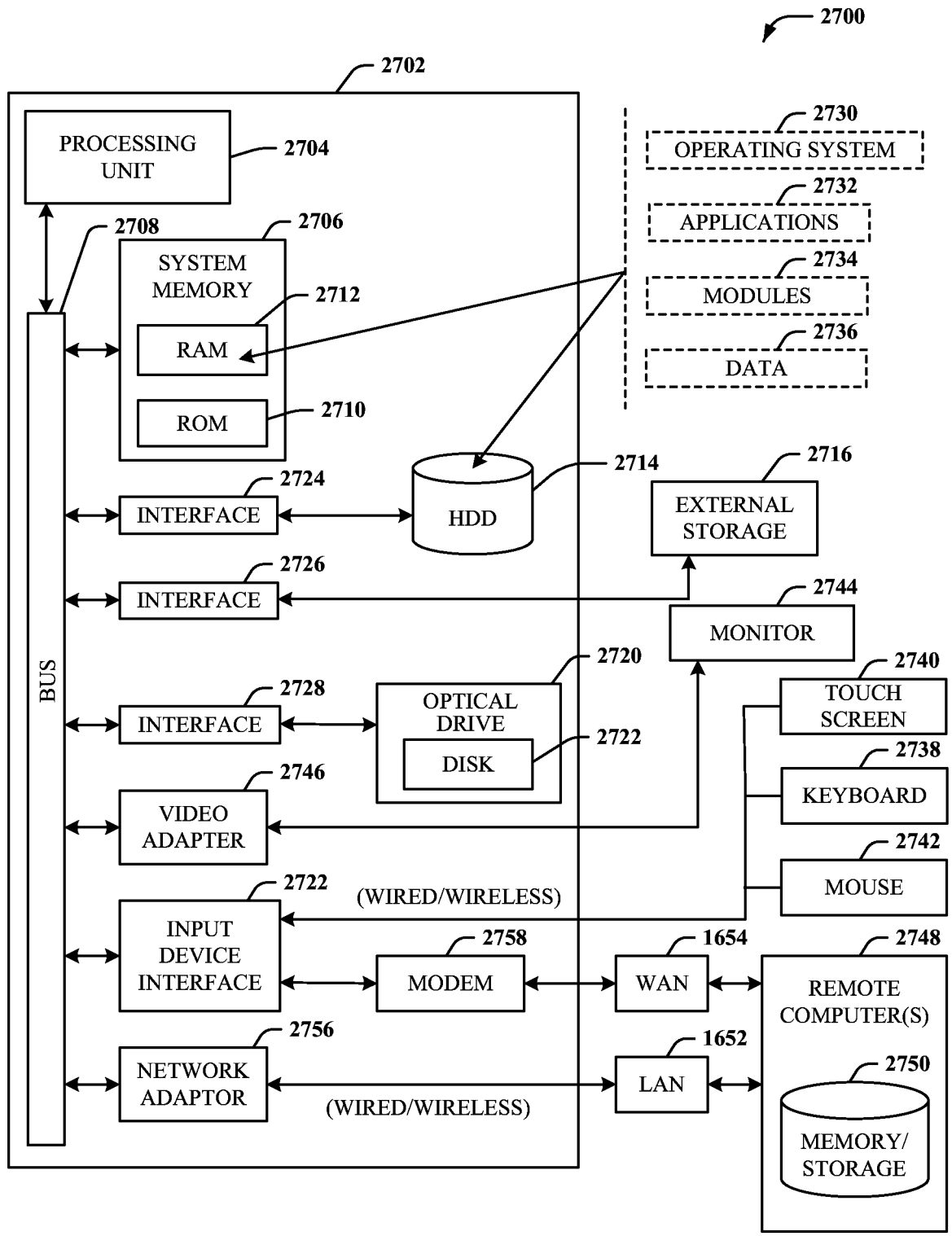
FIG. 27 is an example computing environment.
Figure 28:
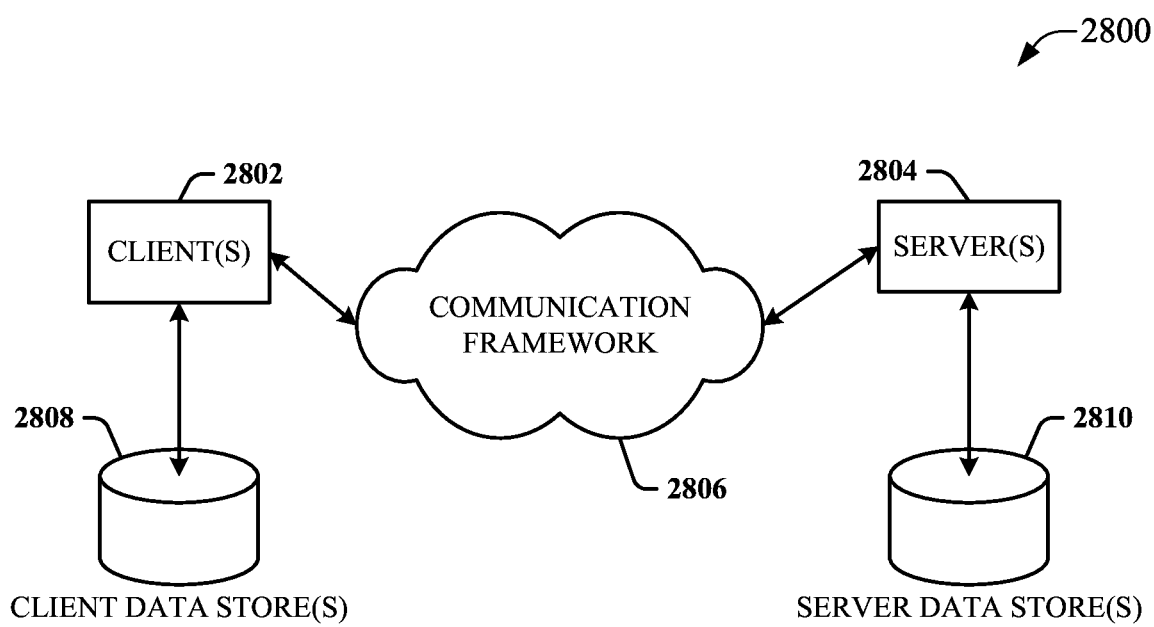
FIG. 28 is an example networking environment.

In order to provide a context for the various aspects of the disclosed subject matter, FIGS. 27 and 28 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 27, the example environment 2700 for implementing various embodiments of the aspects described herein includes a computer 2702, the computer 2702 including a processing unit 2704, a system memory 2706 and a system bus 2708. The system bus 2708 couples system components including, but not limited to, the system memory 2706 to the processing unit 2704. The processing unit 2704 can be any of various commercially available processors. Dual microprocessors and other multi-processor architectures can also be employed as the processing unit 2704.

The system bus 2708 can be any of several types of bus structure that can further interconnect to a memory bus (with or without a memory controller), a peripheral bus, and a local bus using any of a variety of commercially available bus architectures. The system memory 2706 includes ROM 2710 and RAM 2712. A basic input/output system (BIOS) can be stored in a non-volatile memory such as ROM, erasable programmable read only memory (EPROM), EEPROM, which BIOS contains the basic routines that help to transfer information between elements within the computer 2702, such as during startup. The RAM 2712 can also include a high-speed RAM such as static RAM for caching data.

The computer 2702 further includes an internal hard disk drive (HDD) 2714 (e.g., EIDE, SATA), one or more external storage devices 2716 (e.g., a magnetic floppy disk drive (FDD) 2716, a memory stick or flash drive reader, a memory card reader, etc.) and an optical disk drive 2720 (e.g., which can read or write from a CD-ROM disc, a DVD, a BD, etc.). While the internal HDD 2714 is illustrated as located within the computer 2702, the internal HDD 2714 can also be configured for external use in a suitable chassis (not shown). Additionally, while not shown in environment 2700, a solid state drive (SSD) could be used in addition to, or in place of, an HDD 2714. The HDD 2714, external storage device(s) 2716 and optical disk drive 2720 can be connected to the system bus 2708 by an HDD interface 2724, an external storage interface 2726 and an optical drive interface 2728, respectively. The interface 2724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2712, including an operating system 2730, one or more application programs 2732, other program modules 2734 and program data 2736. All or portions of the operating system, applications, modules, and/or data can also be cached in the RAM 2712. The systems and methods described herein can be implemented utilizing various commercially available operating systems or combinations of operating systems.

Computer 2702 can optionally comprise emulation technologies. For example, a hypervisor (not shown) or other intermediary can emulate a hardware environment for operating system 2730, and the emulated hardware can optionally be different from the hardware illustrated in FIG. 27. In such an embodiment, operating system 2730 can comprise one virtual machine (VM) of multiple VMs hosted at computer 2702. Furthermore, operating system 2730 can provide runtime environments, such as the Java runtime environment or the .NET framework, for application programs 2732. Runtime environments are consistent execution environments that allow application programs 2732 to run on any operating system that includes the runtime environment. Similarly, operating system 2730 can support containers, and application programs 2732 can be in the form of containers, which are lightweight, standalone, executable packages of software that include, e.g., code, runtime, system tools, system libraries and settings for an application.

Further, computer 2702 can be enable with a security module, such as a trusted processing module (TPM). For instance with a TPM, boot components hash next in time boot components, and wait for a match of results to secured values, before loading a next boot component. This process can take place at any layer in the code execution stack of computer 2702, e.g., applied at the application execution level or at the operating system (OS) kernel level, thereby enabling security at any level of code execution.

A user can enter commands and information into the computer 2702 through one or more wired/wireless input devices, e.g., a keyboard 2738, a touch screen 2740, and a pointing device, such as a mouse 2742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2704 through an input device interface 2744 that can be coupled to the system bus 2708, but can be connected by other interfaces, such as a parallel port, an IEEE 1394 serial port, a game port, a USB port, an IR interface, a BLUETOOTH® interface, etc.

A monitor 2744 or other type of display device can be also connected to the system bus 2708 via an interface, such as a video adapter 2746. In addition to the monitor 2744, a computer typically includes other peripheral output devices (not shown), such as speakers, printers, etc.

The computer 2702 can operate in a networked environment using logical connections via wired and/or wireless communications to one or more remote computers, such as a remote computer(s) 2748. The remote computer(s) 2748 can be a workstation, a server computer, a router, a personal computer, portable computer, microprocessor-based entertainment appliance, a peer device or other common network node, and typically includes many or all of the elements described relative to the computer 2702, although, for purposes of brevity, only a memory/storage device 2750 is illustrated. The logical connections depicted include wired/wireless connectivity to a local area network (LAN) 2752 and/or larger networks, e.g., a wide area network (WAN) 2754. Such LAN and WAN networking environments are commonplace in offices and companies, and facilitate enterprise-wide computer networks, such as intranets, all of which can connect to a global communications network, e.g., the Internet.

When used in a LAN networking environment, the computer 2702 can be connected to the local network 2752 through a wired and/or wireless communication network interface or adapter 2756. The adapter 2756 can facilitate wired or wireless communication to the LAN 2752, which can also include a wireless access point (AP) disposed thereon for communicating with the adapter 2756 in a wireless mode.

When used in a WAN networking environment, the computer 2702 can include a modem 2758 or can be connected to a communications server on the WAN 2754 via other means for establishing communications over the WAN 2754, such as by way of the Internet. The modem 2758, which can be internal or external and a wired or wireless device, can be connected to the system bus 2708 via the input device interface 2722. In a networked environment, program modules depicted relative to the computer 2702 or portions thereof, can be stored in the remote memory/storage device 2750. It will be appreciated that the network connections shown are example and other means of establishing a communications link between the computers can be used.

When used in either a LAN or WAN networking environment, the computer 2702 can access cloud storage systems or other network-based storage systems in addition to, or in place of, external storage devices 2716 as described above. Generally, a connection between the computer 2702 and a cloud storage system can be established over a LAN 2752 or WAN 2754 e.g., by the adapter 2756 or modem 2758, respectively. Upon connecting the computer 2702 to an associated cloud storage system, the external storage interface 2726 can, with the aid of the adapter 2756 and/or modem 2758, manage storage provided by the cloud storage system as it would other types of external storage. For instance, the external storage interface 2726 can be configured to provide access to cloud storage sources as if those sources were physically connected to the computer 2702.

The computer 2702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 28 is a schematic block diagram of a sample computing environment 2800 with which the disclosed subject matter can interact. The sample computing environment 2800 includes one or more client(s) 2802. The client(s) 2802 can be hardware and/or software (e.g., threads, processes, computing devices). The sample computing environment 2800 also includes one or more server(s) 2804. The server(s) 2804 can also be hardware and/or software (e.g., threads, processes, computing devices). The servers 2804 can house threads to perform transformations by employing one or more embodiments as described herein, for example. One possible communication between a client 2802 and servers 2804 can be in the form of a data packet adapted to be transmitted between two or more computer processes. The sample computing environment 2800 includes a communication framework 2806 that can be employed to facilitate communications between the client(s) 2802 and the server(s) 2804. The client(s) 2802 are operably connected to one or more client data store(s) 2808 that can be employed to store information local to the client(s) 2802. Similarly, the server(s) 2804 are operably connected to one or more server data store(s) 2810 that can be employed to store information local to the servers 2804.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for developing device profiles, comprising:
a memory that stores executable components; and
a processor, operatively coupled to the memory, that executes the executable components, the executable components comprising:
a user interface component that
renders a device profile development interface comprising an explorer window and a configuration area, and
in response to receiving selection of a device profile view from a list of device profile views rendered in the explorer window, displays, in the configuration area, code that defines the device profile view, wherein the device profile views represent respective graphical interfaces of a device profile, the respective graphical interfaces correspond to respective categories of device parameters of an industrial device represented by the device profile, and the categories of device parameters comprise at least one of an alarm category, a port configuration category, a communication configuration category, or a channel configuration category; and
a device profile generation component that modifies the code for the device profile view in accordance with editing input received via interaction with the configuration area to yield modified code, and generates the device profile based on the modified code, wherein
the device profile generates, within an industrial integrated development environment (IDE), the graphical interfaces in accordance with the modified code, and
the graphical interfaces receive configuration input that sets one or more values of the device parameters of the industrial device represented by the device profile.

2. The system of claim 1, wherein the editing input modifies at least one of a graphical control to be included on one of the graphical interfaces, a text element to be included on one of the graphical interfaces, a device parameter of the industrial device to be rendered on one of the graphical interfaces, or a write permission for the device parameter.

3. The system of claim 1, wherein content and formatting of the code is based on a code template for the device profile view selected from the list of device profile views.

4. The system of claim 1, wherein
the device profile generation component verifies a validity of the editing input, and
in response to a determination by the device profile generation component that the editing input is not valid, the user interface component renders a notification indicating that the editing input is not valid.

5. The system of claim 4, wherein the device profile generation component determines the validity of the editing input based on a determination of whether the editing input modifies an element of the code in a manner that satisfies at least one of a data type associated with the element, a value range associated with the element, a maximum data length associated with the element, or a format associated with the element.

6. The system of claim 1, wherein in response to receipt of an instruction to launch a graphical view of the device profile view, the user interface component renders the graphical view in accordance with the modified code.

7. The system of claim 6, wherein
the user interface component receives edits to the device profile view as graphical edits received via interaction with the graphical view, and
the device profile generation component updates the code in accordance with the graphical edits.

8. The system of claim 1, wherein the code comprises tags that label elements of the code that correspond to visual or functional features of the display profile view.

9. The system of claim 1, wherein the categories of device parameters further comprise at least one of a device definition category or a memory category.

10. A method, comprising:
rendering, by a system comprising a processor, a device profile development interface comprising an explorer window and a configuration area;
in response to receiving selection of a device profile view from a list of device profile views rendered in the explorer window, displaying, by the system in the configuration area, code that defines the device profile view, wherein the device profile views represent respective graphical interfaces of a device profile, the respective graphical interfaces are configured to facilitate editing of respective categories of device parameters of an industrial device represented by the device profile, and the categories of device parameters comprise at least one of an alarm category, a port configuration category, a communication configuration category, or a channel configuration category;
in response to receiving, via interaction with the configuration area, editing input directed to an element of the code, modifying, by the system, the code in accordance with the editing input to yield modified code;
generating, by the system, the device profile based on the modified code; and
registering, by the system, the device profile with an industrial integrated development environment (IDE), wherein
the device profile is configured to generate, within the IDE, the graphical interfaces in accordance with the modified code, and
the graphical interfaces are configured to receive configuration input that sets one or more values of the device parameters of the industrial device represented by the device profile.

11. The method of claim 10, wherein the receiving of the editing input comprises receiving editing input that modifies at least one of a graphical control to be included on one of the graphical interfaces, a text element to be included on one of the graphical interfaces, a device parameter of the industrial device to be rendered on one of the graphical interfaces, or a write permission for the device parameter.

12. The method of claim 10, wherein the displaying of the code comprises setting content and formatting of the code based on a code template for the device profile view selected from the list of device profile views.

13. The method of claim 10, further comprising:
in response to the receiving of the editing input, verifying, by the system, a validity of the editing input; and
in response to determining that the editing input is not valid, rendering, by the system, a notification indicating that the editing input is not valid.

14. The method of claim 13, wherein the verifying of the validity of the editing input comprises verifying that the editing input modifies an element of the code in a manner that satisfies at least one of a data type associated with the element, a value range associated with the element, a maximum data length associated with the element, or a format associated with the element.

15. The method of claim 10, further comprising, in response to receiving an instruction to launch a graphical view of the device profile view, rendering, by the system, the graphical view in accordance with the modified code.

16. The method of claim 15, further comprising:
receiving, by the system, edits to the device profile view as graphical edits received via interaction with the graphical view, and
modifying, by the system, the code in accordance with the graphical edits.

17. A non-transitory computer-readable medium having stored thereon instructions that, in response to execution, cause a system comprising a processor to perform operations, the operations comprising:
rendering, on a client device, a device profile development interface comprising an explorer window and a configuration area;
in response to receiving selection of a device profile view from a list of device profile views rendered in the explorer window, displaying, in the configuration area, code that defines the device profile view, wherein the device profile views represent respective graphical interfaces of a device profile, the respective graphical interfaces correspond to respective categories of device parameters of an industrial device represented by the device profile, and the categories of device parameters comprise at least one of an alarm category, a port configuration category, a communication configuration category, or a channel configuration category;
in response to receiving, via interaction with the configuration area, editing input directed to an element of the code, modifying the code in accordance with the editing input to yield modified code;
generating the device profile based on the modified code; and
registering the device profile with an industrial integrated development environment (IDE), wherein
the device profile is configured to generate, within the IDE, the graphical interfaces in accordance with the modified code, and
the graphical interfaces are configured to receive configuration input that sets one or more values of the device parameters of the industrial device represented by the device profile.

18. The non-transitory computer-readable medium of claim 17, wherein the operations further comprise:
in response to the receiving of the editing input, verifying a validity of the editing input; and in response to determining that the editing input is not valid, rendering a notification indicating that the editing input is not valid.

19. The non-transitory computer-readable medium of claim 17, wherein the receiving of the editing input comprises receiving editing input that modifies at least one of a graphical control to be included on one of the graphical interfaces, a text element to be included on one of the graphical interfaces, a device parameter of the industrial device to be rendered on one of the graphical interfaces, or a write permission for the device parameter.

20. The non-transitory computer-readable medium of claim 17, further comprising, in response to receiving an instruction to launch a graphical view of the device profile view, rendering, by the system, the graphical view in accordance with the modified code.

\* \* \* \* \*